(12) United States Patent
Fuchs et al.

(10) Patent No.: US 11,567,588 B2
(45) Date of Patent: *Jan. 31, 2023

(54) COMPUTER INPUT DEVICES WITH HYBRID TRANSLATION MODES

(71) Applicant: Arkade, Inc., Centennial, CO (US)

(72) Inventors: Joshua Allan Fuchs, Granada Hills, CA (US); Joel Abraham Kort, Van Nuys, CA (US); Bob Steven Berns, Hidden Hills, CA (US); Roman Boichuk, Kiev (UA)

(73) Assignee: Arkade, Inc., Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/479,714

(22) Filed: Sep. 20, 2021

(65) Prior Publication Data

US 2022/0382389 A1     Dec. 1, 2022

Related U.S. Application Data

(63) Continuation of application No. 17/329,636, filed on May 25, 2021, now Pat. No. 11,132,070.

(51) Int. Cl.
*G06F 3/0346* (2013.01)
*G06F 3/041* (2006.01)
(Continued)

(52) U.S. Cl.
CPC .......... *G06F 3/0346* (2013.01); *G06F 3/0312* (2013.01); *G06F 3/03543* (2013.01); *G06F 3/04146* (2019.05); *G06F 2203/04105* (2013.01)

(58) Field of Classification Search
CPC .. G06F 3/0346; G06F 3/04146; G06F 3/0312; G06F 3/03543; G06F 2203/04105
(Continued)

(56) References Cited

U.S. PATENT DOCUMENTS 5,717,610 A    2/1998   Baba
7,808,479 B1   10/2010   Hotelling et al.
(Continued)

FOREIGN PATENT DOCUMENTS

JP         2005-148902      6/2005

OTHER PUBLICATIONS

Machine English Translation of JP2005148902A, Jul. 26, 2021, pp. 1-9 (Year: 2021).

*Primary Examiner* — Jimmy H Nguyen
(74) *Attorney, Agent, or Firm* — Volpe Koenig P.C.; Daniel E. Rose

(57) ABSTRACT

In some aspects, the disclosure is directed to methods and systems for a hybrid position and rate control input device comprising: a housing comprising an upper portion and a lower portion; a force-detecting sensor configured to detect a translation or rotation of the upper portion relative to the lower portion; a motion-detecting sensor within one of the upper portion and the lower portion of the housing, configured to detect motion of the housing relative to a surface; a communication interface positioned within the housing; and a processor positioned within the housing configured to select between a first translation signal from the motion-detecting sensor and a second translation signal from the force-detecting sensor; and transmit, via the communication interface to a computing device, the selected translation signal.

20 Claims, 15 Drawing Sheets

(51) Int. Cl.
*G06F 3/0354* (2013.01)
*G06F 3/03* (2006.01)

(58) Field of Classification Search
USPC .................................................. 345/163, 166
See application file for complete search history.

(56) References Cited

U.S. PATENT DOCUMENTS

| | | | |
|---|---|---|---|
| 11,132,070 B1 * | 9/2021 | Fuchs | .................. G06F 3/0338 |
| 2014/0225832 A1 | 8/2014 | Wright et al. | |
| 2018/0088686 A1 | 3/2018 | Zuber et al. | |

* cited by examiner

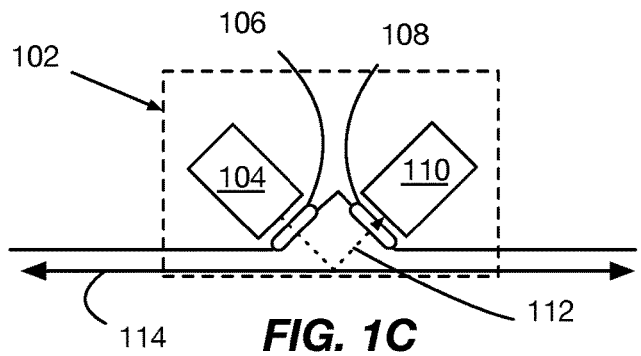
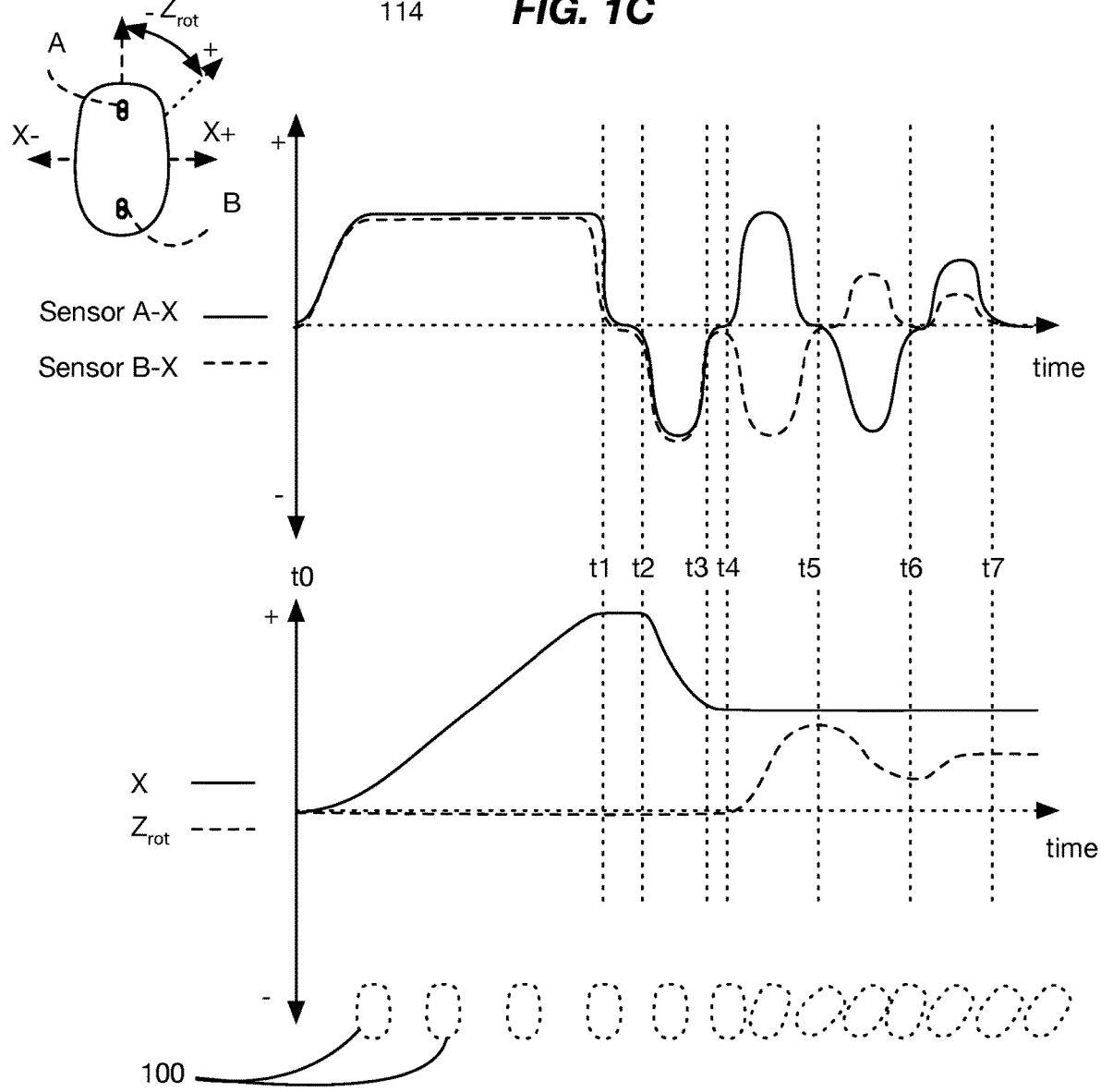
FIG. 1C
FIG. 1D

|     | X- | 0 | X+ |
| --- | --- | --- | --- |
| Y+  | ↖ | ↑ | ↗ |
| 0   | ← | 0 | → |
| Y-  | ↙ | ↓ | ↘ |

Detected direction

FIG. 1E

Sensor A

|   |   | 0 | → | ↘ | ↓ | ↙ | ← | ↖ | ↑ | ↗ |
| --- | --- | --- | --- | --- | --- | --- | --- | --- | --- | --- |
| Sensor B | 0 | 0 | Z+ | Z+ | Error | Z- | Z- | Error | Error | Error |
|  | → | Z- | 0 | Error | Z- | Z- | Z- | Error | Error | Error |
|  | ↘ | Error | Error | 0 | Z- | Z- | Error | Error | Error | Error |
|  | ↓ | Error | Error | Z+ | 0 | Z- | Error | Error | Error | Error |
|  | ↙ | Error | Error | Z+ | Z+ | 0 | Error | Error | Error | Error |
|  | ← | Z+ | Z+ | Z+ | Z+ | Z- | 0 | Error | Error | Error |
|  | ↖ | Z+ | Z+ | Z+ | Z+ | Error | Z+ | 0 | Z+ | Z+ |
|  | ↑ | Error | Z+ | Z+ | Error | Z- | Z- | Z- | 0 | Z+ |
|  | ↗ | Z- | Error | Error | Z- | Z- | Z- | Z- | Z- | 0 |

FIG. 1F

COMPUTER INPUT DEVICES WITH HYBRID TRANSLATION MODES

RELATED APPLICATIONS

This application claims the benefit of and priority as a continuation to U.S. patent application Ser. No. 17/329,636, entitled "Computer Input Devices with Hybrid Translation Modes," filed May 25, 2021, and issued as U.S. Pat. No. 11,132,070 on Sep. 28, 2021, the entirety of which is incorporated by reference herein.

FIELD OF THE DISCLOSURE

This disclosure generally relates to systems and methods for input devices for electronic devices, such as computers. In particular, this disclosure relates to systems and methods for computer input devices with hybrid translation modes including both rate-control translation and position-control translation.

BACKGROUND OF THE DISCLOSURE

Computer pointing devices such as mice may be considered isotonic, displacement-measuring position-control translational input devices with two degrees of freedom (e.g. in the x-y plane). Such input devices may be highly accurate for moving a cursor to a selected target, such as an input element of a user interface, and may also respond quickly to movements by a user. For example, when a user moves a computer mouse, a computer may move a cursor immediately and at a velocity proportional to the velocity of the physical mouse. However, computer mice are typically range-limited: once reaching the edge of a mousepad or other surface, if a user wishes to continue moving the mouse in that direction, they may need to lift the mouse from the surface and reset it at a position in the opposite direction. For user interfaces with borders, such as the borders of a computer desktop, this may not be as crucial, but for user interfaces such as three dimensional environments, the user's ability to control rotation of the interface is significantly impacted. For example, for a user to turn a virtual camera or avatar in a full circle with a mouse, in many instances, they may need to move the mouse to one side of the mousepad, lift the mouse and set it at the other side of the mouse pad, and repeat several times to complete the circle. This may take significant additional time and effort, impairing the user's ability to interact with the virtual environment.

By contrast, a rate-controlled elastic translational input device such as a joystick or a rate-controlled isometric translational input device such as a trackpoint allows for infinite, continuous movement in any direction. A user may hold a joystick to one side to continuously rotate a virtual camera or avatar in the corresponding direction, without needing to pause or reset the position of the joystick. However, because the joystick or trackpoint provides rate-control over velocity of the cursor or camera rather than position-control, it may be slow to begin movement. For example, while a user may immediately and quickly move a mouse a large distance to move a cursor by a correspondingly large distance, the user may need to tilt the joystick to one side and wait as the cursor accelerates from rest to a predetermined top speed. Additionally, while a mouse user may stop a translation in a near instant and reverse direction (improving accuracy when overshooting a target, for example), a joystick user must rotate the joystick from one side to another, with the cursor correspondingly slowing while continuing to travel in the original direction; stopping; and finally reversing, slowly at first and then accelerating, in the reverse direction. This may take significant time, and with small user interface targets that may be easily overshot when aiming a cursor, may cause a high degree of user frustration.

Accordingly, the particular and contrasting benefits and impairments of rate control and position control interface devices mean that each may be preferred for particular uses and disliked for others.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1C is a cross-sectional side view of a sensor for an implementation of a computer input device;

FIG. 1D is a graph illustrating an example of sensor inputs and corresponding translational and rotational movement for an implementation of a computer input device;

FIG. 1E is a key of symbols for detected directional motion for the chart of FIG. 1F;

FIG. 1F is a chart illustrating an example of directions of rotation according to various sets of detected directional motions for a pair of sensors of an implementation of a computer input device;

Figure 1A:
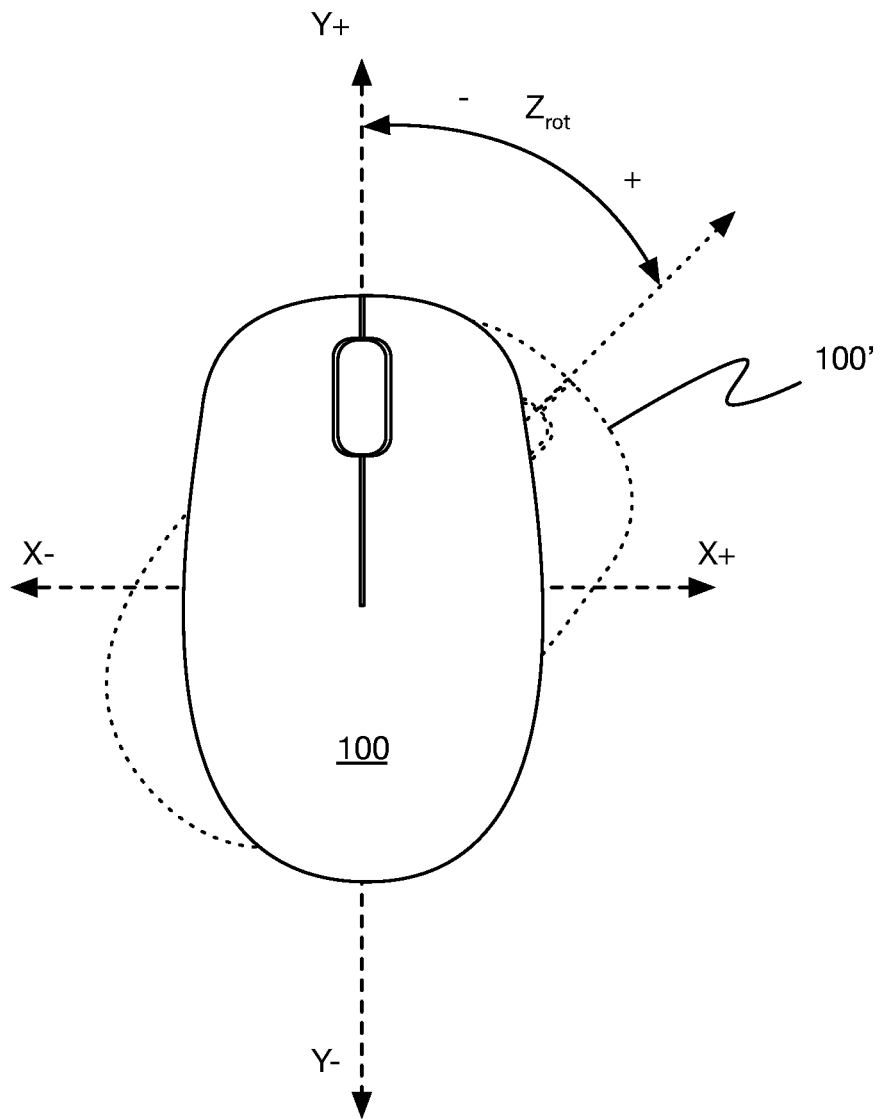
FIGS. 1A and 1B are top and bottom views, respectively, of an implementation of a computer input device having a rotational degree of freedom.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for advanced computer input devices having rotational and translation degrees of freedom;

Section B describes embodiments of systems and methods for computer input devices with hybrid translation modes; and Section C describes a computing environment which may be useful for practicing embodiments described herein.

A. Computer Input Devices Having Rotational and Translation Degrees of Freedom Computer input devices such as mice are typically limited to two degrees of freedom, such as x-axis and y-axis translations of a standard computer mouse. This can be limiting for developers wishing to provide a greater range of controls, and also impair realism in simulations. Other input devices, such as joysticks or 3D mice, allow for more degrees of freedom, but are limited to rotational degrees (e.g. pitch, roll, and yaw). While these inputs may be mapped to translations (e.g. left and right on a joystick, typically used for roll, being instead used to move a cursor left and right), because joysticks and 3D mice are rate-control devices, they tend to be inaccurate, less intuitive, and slower to move than position-control input devices such as conventional mice. For example, to aim a cursor at an interface element across the monitor from a current position, a user may easily and intuitively move a conventional mouse in the direction of the target for a distance proportional to the distance to be covered by the cursor on the monitor. By contrast, to aim a cursor at an interface element using a joystick, a user may need to push the joystick to an extreme tilt in a direction, and then hold that position as the cursor accelerates to a predetermined speed. Worse, if a user overshoots a target with a conventional mouse, they may simply move their hand back slightly to realign the cursor with the target; but with a joystick, a user approaching a target from the left and overshooting the target would need to move the joystick from a right tilt all the way back through zero to a left tilt. This is significantly slower.

Instead, the advanced computer input device described herein addresses these issues by adding a rotational degree of freedom to the standard two translation degrees of freedom (x and y) of a traditional mouse, in an easy and intuitive fashion. A plurality of independent position sensors may be arranged on a lower surface of the computer input device, each determining a direction and velocity of motion of the input device when in use. The detected directions and velocities may be compared to determine whether a rotational motion of the input device has been applied as opposed to (or in addition to) a translation. In some implementations, the additional sensors may also provide greater accuracy for translation detection, for example by averaging sensor data, or by disregarding sensor data that may be erroneous (e.g. a loss of detection of motion during a translation, such as due to dust or debris blocking a sensor).

Figure 1B:
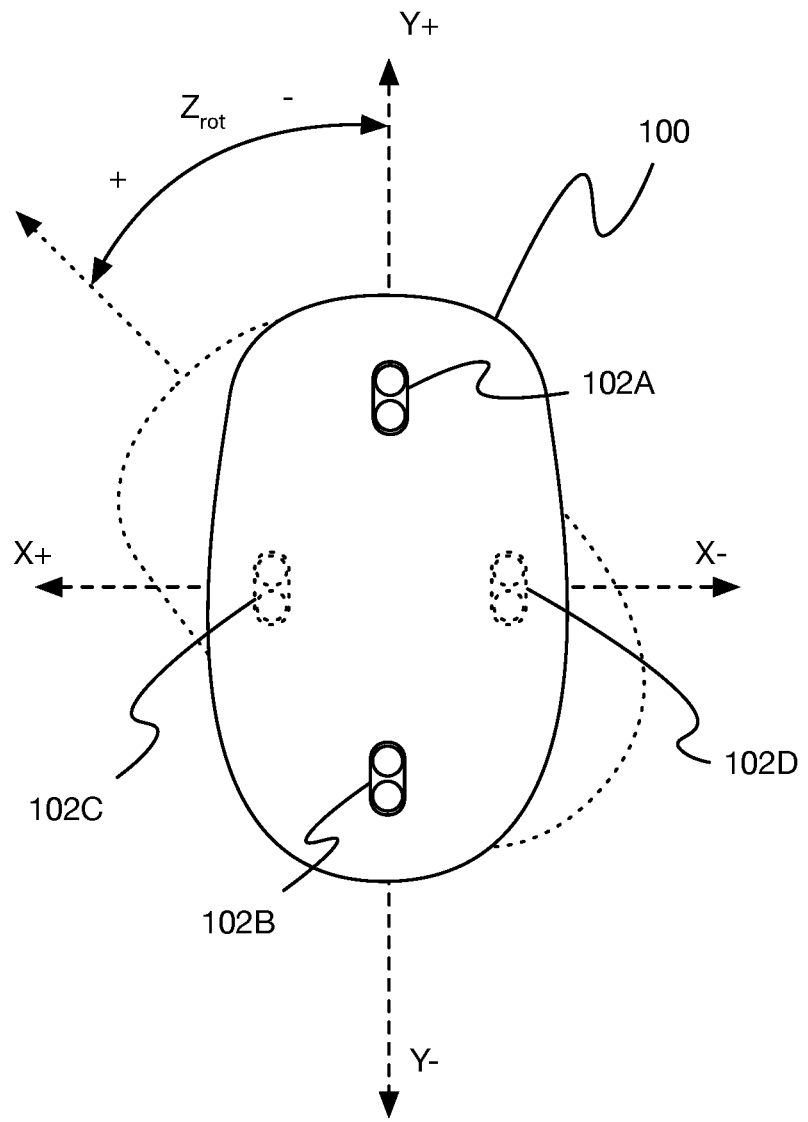

FIGS. 1A and 1B are top and bottom views, respectively, of an implementation of a computer input device 100 having a rotational degree of freedom ($Z_{rot}$, or rotation around the z-axis perpendicular to the page) and two translational degrees of freedom (X± along the x-axis to the left and right, and Y± along the y-axis up and down). The axes are labeled for convenience, but different axes may be utilized in various implementations (e.g. a translational Z axis could be utilized in place of a Y axis, or a rotational X axis could be utilized in place of the translational X axis, such as turning a view left and right within a three dimensional environment). As shown in the bottom view of FIG. 1B, the input device 100 may comprise a plurality of sensors 102A-102D (or additional sensors not illustrated) referred to generally as sensor(s) 102. The plurality of sensors may be spaced at locations separated from a centroid of the input device. When the input device 100 is rotated around the z-axis ($Z_{rot}$), the centroid may remain in approximately the same position while the sensors 102 move an amount proportional to their distance from the centroid. For example, when rotating the input device in the positive $Z_{rot}$ direction, sensor 102A may show a large movement in the positive X direction and negative Y direction, while sensor 102B shows a similar movement in the negative X direction and positive Y direction. These distances and directions may be compared in order to detect a rotation of the input device 100. Advantageously, the sensors 102 also provide translation detection, avoiding the need for additional dedicated sensors to detect rotation (e.g. balls, coils, wheels, inertial measurement units, accelerometers, etc.).

Although shown symmetrically positioned across the bottom surface of the controller 100, other arrangements are possible. For example, the sensors 102 may be positioned on one side or another of a centerline of the controller. Additionally, although shown with pairs, different numbers of sensors are possible. For example, in some implementations, three sensors may be positioned across the bottom surface of the controller (e.g. in an equilateral or isosceles triangle).

Referring briefly to FIG. 1C, illustrated is a cross-section view (not to scale) of a sensor 102 for an implementation of a computer input device 100. The sensor 102 may comprise an optical or infrared sensor 110 and, in many implementations, may include a corresponding optical or infrared emitter 104 (e.g. LED or OLED illuminator, a laser, etc.). In some implementations, the sensor and optional emitter may be uncovered, while in other implementations an emitter cover or lens 106 and sensor cover or lens 108 may be employed (e.g. as a translucent cover for protection of sensor 110 and emitter 104, or as curved lenses to properly focus light 112 from emitter 104 on sensor 110). As shown, light 112 from emitter 104 may be reflected off surface 114 and received by sensor 110 to illuminate the surface and detect changes in successive images of the surface to determine motion. For example, in some implementations, sensor 110 may comprise an X-Y array of image sensors (e.g. a CCD, CMOS sensor, etc.), and may take successive images of the illuminated surface at a predetermined frequency. These images may be compared to determine an amount and direction of motion (e.g. a translation or motion vector between the two images) at the predetermined frequency, allowing for calculation of a two-dimensional vector proportional to the velocity.

As discussed above, outputs of different sensors may be compared to detect rotation of the input device. For example, FIG. 1D is a graph illustrating an example of sensor inputs and corresponding translational and rotational movement (not to scale) for an implementation of a computer input device. The key shown at upper left illustrates a top-down view of an input device 100, positive and negative directions along the X axis, as well as positive and negative rotation directions around the Z axis. The key also identifies a first sensor (A) near the top of the input device and a second sensor (B) near the bottom of the input device (although visible in the illustration for explanation purposes, the sensors would be on the bottom of the input device and not visible in most implementations).

For clarity and ease of explanation, only the X-axis outputs of sensors A (solid line) and B (dashed line) are shown in the top graph. Similarly, only X-axis translations (solid line) and Z-axis rotations (dashed line) are illustrated in the bottom graph. Both graphs are time-aligned.

As shown in the top graph, from t0-t1, both sensors A and B detect a velocity to the right (X+) that ceases at t1. At t2-t3, both sensors detect a velocity to the left. As shown in the bottom graph, from t0-t1, the input device is moved to the right (X+); at t1-t2, the input device is stationary; and at t2-t3, the input device is moved back to the left, albeit less than the amount moved to the right at t0-t1.

As shown in the top graph, at t4-t5, sensor A detects a velocity to the right (X+) while sensor B detects a velocity to the left (X−). This represents a rotation around a position between the two sensors (e.g. the centroid of the input device). As shown in the bottom graph, from t4-t5, the input device is rotated clockwise (see also dashed-line images of input device 100 beneath the graphs, illustrating corresponding rotational orientations at the noted times).

In many implementations, rotation of the input device may not be perfectly centered at the centroid or position between the sensors. This may result in still-detectable differences in sensor outputs, albeit with different amplitudes. For example, from t5-t6 in the upper graph, sensor A detects a large velocity to the left, while sensor B detects a smaller velocity to the right. As shown in the lower graph, this may be identified as a counter-clockwise rotation, albeit not around the centroid of the input device, and accordingly may be identified as a smaller rotation. Similarly, in some implementations, both sensors may detect a velocity in the same direction (e.g. X+ at t6-t7) with different amplitudes. This may be similarly interpreted as a clockwise rotation as shown, with a slight movement to the right of the lower portion (in the Y direction) of the input device and a large movement to the right of the upper portion (in the Y direction) of the input device.

Although shown stationary from t5-t7 in the lower graph, in some implementations, rotations not around the centroid of the input device may be interpreted as simultaneous rotations and translations. For example, in one such implementation, rather than being stationary from t6-t7, the input device may detect an overall velocity to the right (X+), coupled with a clockwise rotation.

The velocities detected from different sensors may be correlated to determine an overall rotation, as shown in the chart of FIG. 1F. Referring first to FIG. 1E, illustrated is a key of symbols for detected directional motion from a sensor. For example, if a sensor detects a translation to the right (X+) and up (Y+), the combined vector may be up and right, as shown in the upper right cell of the key. The key is simplified for convenience and does not illustrate relative amplitudes and resulting vector angles.

The vector symbols are used in the chart of FIG. 1F, which illustrates an example of directions of rotation according to various sets of detected directional motions for a pair of sensors (e.g. sensor A at the top of an input device and sensor B at the bottom of the input device, as shown in FIG. 1D) of an implementation of a computer input device 100. As shown in the chart, if sensor A detects a translation to the right and sensor B detects no translation, the result may be interpreted as a clockwise rotation (Z+). Similarly, if sensor A detects a translation up and to the left, and sensor B detects a translation up and to the right, the result may be interpreted as a counter-clockwise rotation (Z−).

As shown, several combinations of detected velocities may be interpreted as errors. For example, because the sensors are at fixed positions relative to each other, if sensor A detects a velocity up (Y+) and sensor B detects an opposing velocity down (Y−), one or both readings must be erroneous (e.g. due to dust or debris on a lens of a sensor). In some implementations, in case of error, a previously identified direction of rotation or translation may be utilized (e.g. during a previous imaging and comparison cycle). This may be particularly useful where the change in velocity vectors in subsequent cycles (e.g. the derivative or acceleration between successive vectors) is very high, suggesting an error. For example, if a series of images taken microseconds apart show a consistent translation velocity to the right and a subsequent image shows a sudden velocity to the left, the acceleration in the X− direction indicated by the sensor may be huge. If this acceleration exceeds a threshold, in some implementations, the new velocity reading may be disregarded. Advantageously, with a plurality of sensors, if an erroneous velocity detected by one sensor is disregarded, the velocity detected by another sensor may be utilized to move a cursor, providing seamless error recovery and high reliability and accuracy.

Figure 1G:
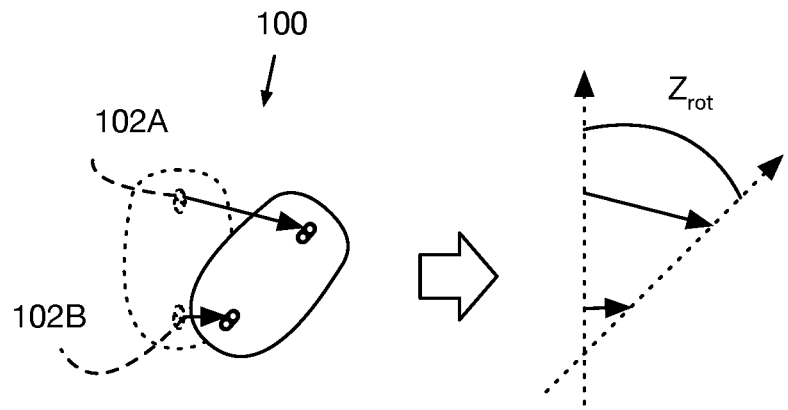
FIG. 1G is an illustration of measurement of rotational motion of an implementation of a computer input device.

In another implementation, sensor vectors and a known distance between the sensors and edges of the input device may be utilized to accurately measure rotation of the input device. FIG. 1G is an illustration of measurement of rotational motion of an implementation of a computer input device 100. As shown, sensors 102A, 102B may each detect a movement (corresponding arrows). Because the distance between these sensors is known, as well as the positions of the sensors on the input device, a resulting rotation of the input device may be calculated as a function of vector translations and their moments around the centroid of the input device.

Figure 2:
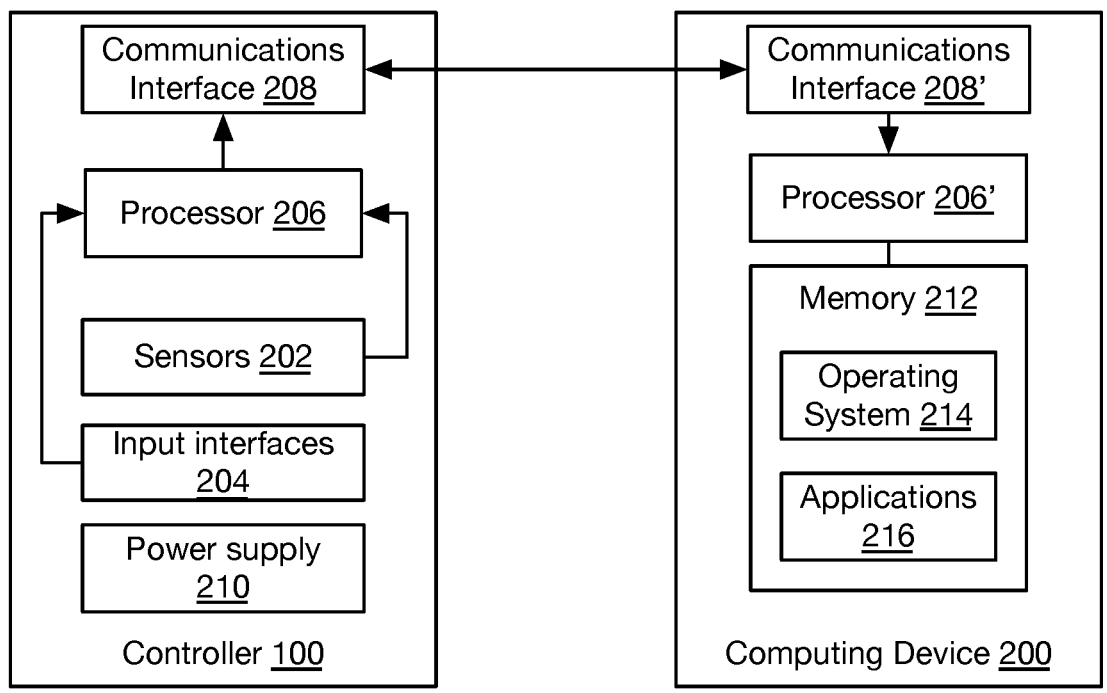
FIG. 2 is a block diagram of an implementation of a computer input device and computing environment.

FIG. 2 is a block diagram of an implementation of a computer input device 100 and computing environment, including a second computing device 200, such as a desktop computer, laptop computer, workstation, console, tablet computer, appliance, or other electronic device. In many implementations, a controller 100 may comprise some or all of a plurality of sensors 202, one or more input interfaces 204 (e.g. buttons, scroll wheels, touch-sensitive surfaces, etc.), a processor or processors 206, one or more communications interfaces 208, and a power supply 210.

Still referring to FIG. 2 and in more detail, in some implementations, a controller 100 may comprise a plurality of sensors 202, which may comprise sensors 102 as discussed above. In some implementations, sensors 202 may comprise CMOS image arrays of a given size (e.g. 16×16, 8×8, 32×32, or any other such size and shape), and may include illuminators or emitters such as laser diodes, infrared LEDs, etc. Because a plurality of sensors are used in combination, in some implementations, an imaging array may be rectangular in shape. For example, rather than a square array, an image array may be 8×16, 16×32, etc. While this may reduce resolution in one direction, because pairs of sensors are used to detect motion, the resulting sensor outputs may be used in combination to determine motion in those reduced-resolution directions at a higher resolution than provided by a single sensor. For example, given a controller 100 with two image sensors of 8×16 pixels, with the 8 pixels oriented along the Y axis, if the controller is moved upwards (e.g. in the Y+ direction), one sensor may detect movement of one pixel within the imaging time period, while the other sensor does not detect any movement. The output of the sensor detecting movement may be utilized and the non-movement detecting sensor signal disregarded. This effectively doubles the resolution of the sensors. In a similar example, if one sensor detects movement of 3 pixels and the other sensor detects movement of 1 pixel, these output values may be averaged and a movement of 2 pixels during the imaging time period provided to the computing device, again effectively doubling the resolution. This may be particularly valuable for sensor pairs that are aligned along an axis (e.g. using arrays that are shorter in the Y direction for sensors aligned on the Y-axis of the controller, or arrays that are narrower in the X direction for sensors aligned on the X-axis of the controller). Such implementations may allow for reduced cost in manufacturing and utilization of arrays with manufacturing errors at the edges that would otherwise be discarded as waste.

In addition to optical sensors 202, in some implementations, controller 100 may include additional sensors, such as inertial measurement units, accelerometers, three-dimensional orientation sensors, magnetic sensors, or mechanical sensors. For example, in some implementations, controller 100 may include a pair of optical sensors and an X-Y accelerometer.

Controller 100 may also include one or more input interfaces 204, such as buttons, scroll wheels, thumbwheels, joysticks, directional pads, paddles or rocker switches, touch-sensitive surfaces (e.g. resistive or capacitive touchpads), fingerprint scanners, or other such input interfaces. Triggers detected from each interface may be provided to a computing device 200 via a human interface device (HID) driver, such as mouse clicks (e.g. click down and click up) events, taps, drags, double-clicks, directional buttons, etc.

Controller 100 may include a processor 206. Processor 206 may comprise any type and form of processor, and in many implementations, may comprise an application-specific integrated circuit (ASIC) or field-programmable gate array (FPGA) configured to receive sensor signals, correlate the signals to determine translations and/or rotations, and provide the signals via a communication interface 208 to a computing device 200. Processor 206 may also control one or more output devices (not illustrated) such as LEDs for battery or communication status, aesthetic appearance, or button indications, as well as dynamically powering an emitter (e.g. reducing emitter power when the controller is not being moved).

Communications interface 208 may comprise any type and form of interface, such as a USB interface, Bluetooth interface, WiFi interface, etc., and may comprise corresponding hardware (e.g. wireless transmitters, physical ports, etc.). In many implementations, a controller may include multiple communications interfaces 208, such as a Bluetooth interface for wireless use and a USB interface for wired use. For wireless implementations, controller 100 may comprise a power supply 210 such as a rechargeable or replaceable battery.

Communications interface 208 of the controller 100 may communicate wirelessly or via a physical connection (e.g. USB cable) with a corresponding communications interface 208' of a computing device 200, which may include several such communications interfaces. Computing device 200 may similarly comprise one or more processors 206'. Computing device 200 may also include a memory device 212, which may store an operating system 214 for execution by processor 206' as well as one or more applications 216. User interfaces may be provided by the operating system 214 and/or applications 216, which may include movable cameras, cursors, or selectable interface elements such as buttons, scroll bars, or other such entities. The operating system 214 may comprise a human interface device (HID) driver for interpreting signals from the controller 100, such as movement or detected translation velocities (e.g. in the X or Y directions) as well as rotations (e.g. around the Z axis, or any other axis, depending on configuration).

Figure 3:
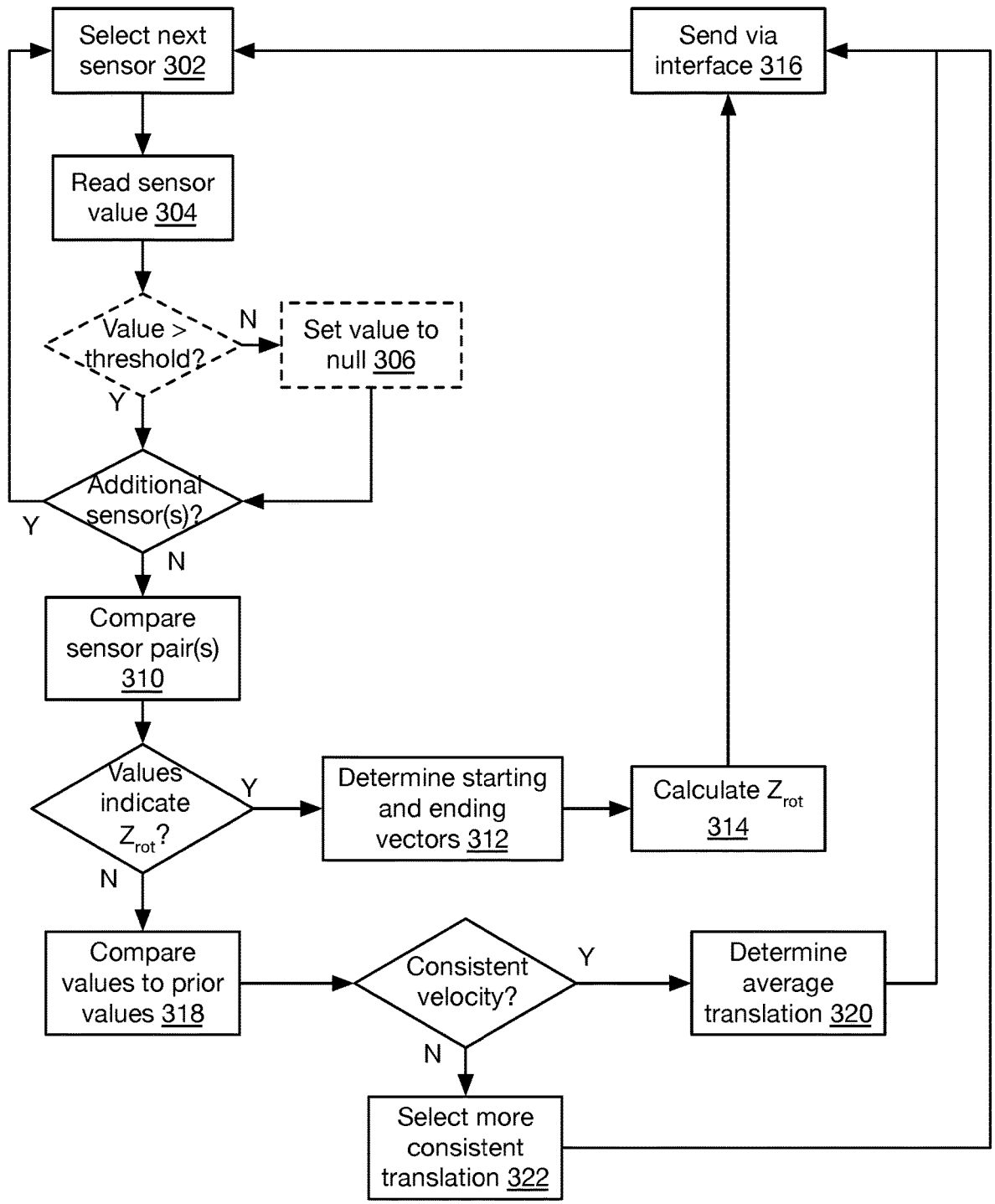
FIG. 3 is a flow chart of an implementation of providing translational and rotational motion values for an implementation of a computer input device.

FIG. 3 is a flow chart of an implementation of providing translational and rotational motion values for an implementation of a computer input device. At step 302, a processor of the controller may read a value from a sensor, such as an optical sensor or imaging CMOS sensor. Although referred to as a value, in many implementations, the "value" may be a processed value such as a velocity vector (e.g. x and y coordinates) representing a velocity detected by the sensor over a predetermined imaging period (e.g. 1 millisecond, 1 microsecond, etc.). In some implementations, the images may be processed by the processor, while in other implementations, the images may be processed by a dedicated co-processor (e.g. ASIC performing digital image correlation).

Optionally, in some implementations, to avoid false readings, the velocity vector or value may be compared to a threshold, and if the value is less than the threshold, at step 304, the value may be set to 0 or null (providing a "dead zone" for movement, and avoiding jitter from very slight detected movements of the controller). In other implementations, the value may be compared to another (e.g. upper) threshold, and if the value is greater than the threshold, the value may be set to 0 or null (e.g. avoiding errors from false positives or detected motion that is unlikely to be realistic, on the orders of meters per second or more). In still other implementations, these steps may be skipped.

If there are additional sensors, then at step 306, the next sensor selected and values read or images correlated at steps 302-304.

At step 308, velocity vectors from different sensors may be compared, and particularly sensors in predetermined positions or in opposition to each other around a centroid of the controller. As discussed above, comparing the vectors may comprise comparing both direction and amplitude of the vectors. Vectors in opposing directions may indicate a rotation, or may indicate an erroneous input, depending on the specific directions, as discussed above. If the directions and amplitudes indicate a potential rotation, then at step 310 in some implementations, starting and ending vectors may be determined for the sensors, and at step 312, a rotation of the controller around the z-axis may be calculated (e.g. a rotation of a line through the sensors and centroid of the controller in an initial position to a second position through the sensors' new locations and the centroid, according to each sensor's determined velocity vector). In some implementations, this may be done by calculating an inverse tangent of a slope of a line through the ending positions of each sensor relative to a previous position (e.g. $\tan \theta = (Ax-Bx)/(Ay-By)$). In other implementations, other methods may be utilized (e.g. determining a resultant vector for the centroid based on each sensor's vector and its distance from the centroid, etc.). At step 316, this rotation may be transmitted via a communication interface to a computing device. Although representing a rotation around the z-axis of the controller, this axis may be mapped by an operating system or application of the computing device to another axis. For example, the rotation may be used for roll, rotation of a control surface (e.g. a rudder of a boat or plane, or a nose steering wheel of a plane), a leaning left or right action within a three-dimensional virtual environment, or any other such movement. In some implementations, the movement may be used for navigation between webpages or tabs of a browser, between windows of an application, etc. For example, a user may rotate the controller one way to advance to a next tab and the other way to return to a previous tab.

If the sensor values do not indicate a rotation, then at step 318 in some implementations, the sensor values may be compared to prior values or vectors (e.g. determining an acceleration based on two successive velocity measurements for each sensor). If the velocity is consistent with the prior velocity for each sensor—that is, if the acceleration between successive velocity measurements is less than a threshold for each sensor—then at step 320 in some implementations, an average vector may be determined from the sensors and used for a translation vector of the controller. The translation vector may be provided to a computing device via the interface at step 316. If the velocity for either sensor is not consistent with a prior velocity—that is, if the acceleration between two velocity measurements exceeds a threshold—then the reading may be erroneous, and in some implementations, at step 322, the more consistent velocity measurement or sensor detecting a smaller acceleration between subsequent velocity measurements may be utilized as the translation vector for the controller. This may increase reliability as discussed above, avoiding issues with erroneous readings due to dust or debris on a sensor. The translation vector may be provided to a computing device via the interface at step 316, as discussed above.

Accordingly, the systems and methods discussed herein provide for an advanced computer input device with a rotational degree of freedom ($z_{rot}$) in addition to two translation degrees of freedom (x and y), in an easy and intuitive fashion. A plurality of independent position sensors may be arranged on a lower surface of the computer input device, each determining a direction and velocity of motion of the input device when in use. The detected directions and velocities may be compared to determine whether a rotational motion of the input device has been applied as opposed to (or in addition to) a translation. In some implementations, the additional sensors may also provide greater accuracy for translation detection, for example by averaging sensor data, or by disregarding sensor data that may be erroneous (e.g. a loss of detection of motion during a translation, such as due to dust or debris blocking a sensor).

In one aspect, the present disclosure is directed to a computer input device. The computer input device includes a housing; a communication interface positioned within the housing; a first motion-detecting sensor positioned at a first location on an underside of the housing; a second motion-detecting sensor positioned at a second location on an underside of the housing; and a processor positioned within the housing. The processor is configured to: receive a first signal indicating a first translation detected by the first motion-detecting sensor; receive a second signal indicating a second translation detected by the second motion-detecting sensor; identify, based on the first translation and the second translation, a rotation of the housing; and transmit, via the communication interface to a computing device, a signal comprising the identified rotation.

In some implementations, the first location is in opposition to the second location across a centroid of the underside of the housing. In some implementations, the first motion-detecting sensor and second motion-detecting sensor each comprise an imaging array. In a further implementation, at least one imaging array of the first motion-detecting sensor and the second motion-detecting sensor is an oblong rectangular array. In some implementations, the communication interface comprises a wireless communication interface. In some implementations, the communication interface comprises a wired communication interface.

In some implementations, at least one of the first motion-detecting sensor and the second motion-detecting sensor further comprises an illuminator. In some implementations, the first motion-detecting sensor and the second motion-detecting sensor are configured to detect a translation in an X-Y plane; and wherein the processor is further configured to identify the rotation of the housing around a Z-axis orthogonal to the X-Y plane. In a further implementation, the processor is further configured to identify the rotation of the housing responsive to the first translation having a first direction and the second translation having a second, opposing direction. In another further implementation, the first translation includes a positive X translation and the second translation includes a negative X translation.

In some implementations, the processor is further configured to: receive a third signal indicating a third translation detected by the first motion-detecting sensor; receive a fourth signal indicating a fourth translation detected by the second motion-detecting sensor; identify, based on the third translation and the fourth translation, a lack of rotation of the housing; determine a translation of the housing based on the third translation and the fourth translation; and transmit, via the communication interface to a computing device, a signal comprising the determined translation of the housing. In a further implementation, the processor is configured to identify a lack of rotation of the housing responsive to the third translation and the fourth translation having vectors with directions within a predetermined threshold angle of each other. In another further implementation, the processor is configured to determine a first acceleration between the first translation and the third translation. In a still further implementation, the processor is configured to disregard the third translation responsive to the first acceleration exceeding a threshold. In a yet still further implementation, the processor is configured to determine the translation of the housing corresponds to the fourth translation, responsive to the first acceleration exceeding the threshold. In another further implementation, the processor is configured to determine a second acceleration between the second translation and the fourth translation; and determine the translation of the housing corresponds to an average of the third translation and the fourth translation, responsive to the first acceleration and the second acceleration each being less than a threshold.

In some implementations, the computer input device comprises at least one input button. In some implementations, the computer input device comprises at least one input wheel.

In another aspect, the present disclosure is directed to a method for providing a rotational input signal via a computer input device. The method includes detecting, by a first motion-detecting sensor positioned at a first location on an underside of the computer input device, a first translation in a first direction. The method also includes detecting, by a second motion-detecting sensor positioned at a second location on the underside of the computer input device, a second translation in a second direction. The method also includes calculating a rotation of the computer input device according to the first translation and the second translation, responsive to the first direction opposing the second direction. The method also includes providing, to a computing device, an identification of the rotation of the computer input device.

In some implementations, the method includes detecting, by the first motion-detecting sensor, a third translation in a third direction; detecting, by the second motion-detecting sensor, a fourth translation in a fourth direction; calculating a translation of the computer input device according to the third translation and the fourth translation, responsive to the third direction not opposing the fourth direction; and providing, to a computing device, an identification of the translation of the computer input device.

B. Computer Input Devices Having Hybrid Translation Modes

Computer pointing devices such as mice may be considered isotonic, displacement-measuring position-control translational input devices with two degrees of freedom (e.g. in the x-y plane). Such input devices may be highly accurate for moving a cursor to a selected target, such as an input element of a user interface, and may also respond quickly to movements by a user. For example, when a user moves a computer mouse, a computer may move a cursor immediately and at a velocity proportional to the velocity of the physical mouse. However, computer mice are typically range-limited: once reaching the edge of a mousepad or other surface, if a user wishes to continue moving the mouse in that direction, they may need to lift the mouse from the surface and reset it at a position in the opposite direction. For user interfaces with borders, such as the borders of a computer desktop, this may not be as crucial, but for user interfaces such as three dimensional environments, the users ability to control rotation of the interface is significantly impacted. For example, for a user to turn a virtual camera or avatar in a full circle with a mouse, in many instances, they may need to move the mouse to one side of the mousepad, lift the mouse and set it at the other side of the mouse pad, and repeat several times to complete the circle. This may take significant additional time and effort, impairing the user's ability to interact with the virtual environment.

Figure 4A:
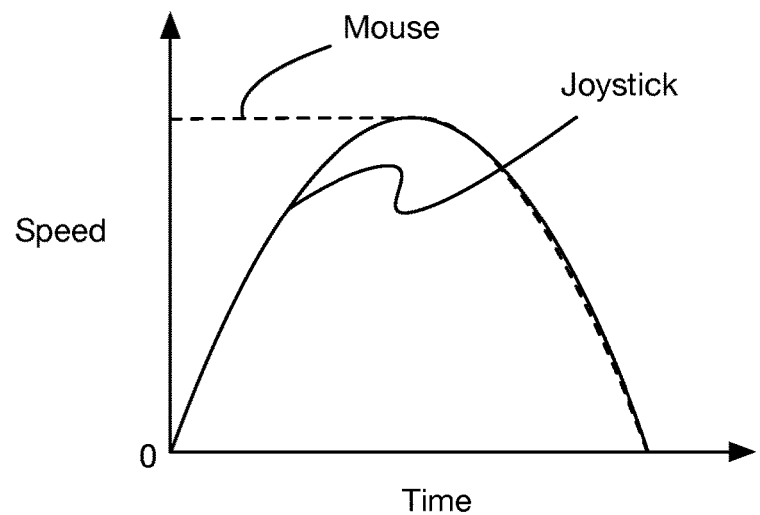
FIG. 4A is a chart comparing an example speed of cursor movement via position control and rate control input devices.

By contrast, a rate-controlled elastic translational input device such as a joystick or a rate-controlled isometric translational input device such as a trackpoint allows for infinite, continuous movement in any direction. A user may hold a joystick to one side to continuously rotate a virtual camera or avatar in the corresponding direction, without needing to pause or reset the position of the joystick. However, because the joystick or trackpoint provides rate-control over velocity of the cursor or camera rather than position-control, it may be slow to begin movement. FIG. 4A is a chart comparing an example speed of cursor movement via position control (e.g. a mouse) and rate control input devices (e.g. a joystick). As shown, while a user may immediately and quickly move a mouse a large distance to move a cursor by a correspondingly large distance, the user may need to tilt the joystick to one side and wait as the cursor accelerates from rest to a predetermined top speed. Additionally, while a mouse user may stop a translation in a near instant and reverse direction (improving accuracy when overshooting a target, for example), a joystick user must rotate the joystick from one side to another, with the cursor correspondingly slowing while continuing to travel in the original direction; stopping; and finally reversing, slowly at first and then accelerating, in the reverse direction. This may take significant time, and with small user interface targets that may be easily overshot when aiming a cursor, may cause a high degree of user frustration.

Accordingly, the particular and contrasting benefits and impairments of rate control and position control interface devices mean that each may be preferred for particular uses and disliked for others. Many users end up with multiple input devices connected simultaneously, and attempt to switch between them during use dependent on what is preferred at a particular moment, or use a less accurate rate-control device with their non-dominant hand and a position-control device with their dominant hand (which prevents them from using the keyboard simultaneously). For example, some users of CAD programs attempt to use a 3D joystick for camera control with their non-dominant hand and a mouse for accurate pointing and selection with their dominant hand, though they have to switch one or both hands back and forth between the controllers and a keyboard for inputting most commands. Similarly, some modern video games include some moments with operation of vehicles (e.g. planes or spaceships) where a joystick is preferred, and others outside of the vehicle with first-person shooter components where a mouse and keyboard is preferred, requiring users to clumsily switch controls at tense moments.

Figure 4B:
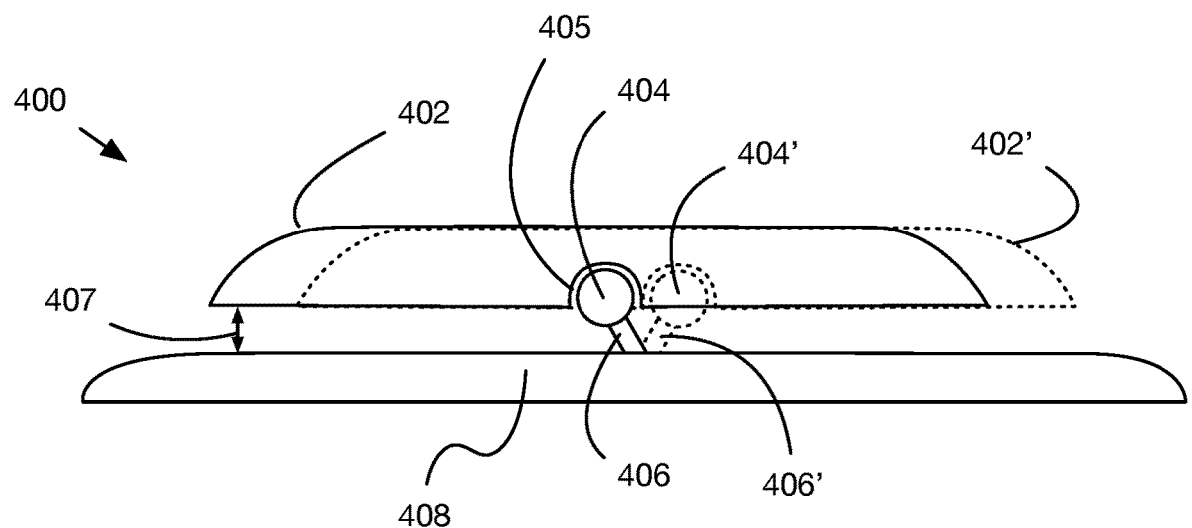
FIG. 4B is an illustration of an embodiment of a hybrid position and rate control input device.

The systems and methods discussed herein provide a new hybrid position and rate control input device. The input device incorporates aspects of both joysticks or trackpoints and computer mice to provide for easy and intuitive translation movement with both high accuracy and limitless, continual movement. FIG. 4B is an illustration of an embodiment of a hybrid position and rate control input device 400, shown not to scale and with components enlarged to show features and interactions. The input device 400 may include a top portion 402 and bottom portion 408 separated by a slight gap 407 (not to scale). Bottom portion 408 may include features of position control devices such as optical sensors (not illustrated), including a plurality of optical sensors for detection of both translation and rotation as discussed above. Top portion 402 may include one or more input elements (not illustrated) such as buttons, scroll wheels, touchpads, fingerprint scanners, trackpoints, thumbwheels, toggles or pedal switches, or any other type and form of input element.

The top portion 402 may be joined to bottom portion 408 via a joint having at least two translational degrees of freedom, e.g. a ball and socket joint as shown with ball 404 connected to shaft 406 connected within a corresponding socket 405 of the top portion. As noted above, the components of FIG. 4B are not shown to scale—in many implementations, the top portion 402 and bottom portion 408 would be both closer together and larger than illustrated, with a small seam or gap 407; similarly, the joint (e.g. ball and socket or other) would typically be smaller. In many such implementations, a large ball 404 as shown may be unnecessary, and the shaft may directly connect top portion 402 and bottom portion 406, with the shaft connected via a slidable or rotatable joint (e.g. a planar joint, potentially with a restricted or locked rotational degree of freedom) at one or both connections.

The bottom portion 408 and/or top portion 402 may include a sensor or rate-control sensitive element connected to the ball 404 and/or shaft 406 to detect deflection of the top portion 402 against the bottom portion 408 (e.g. as shown in dashed line 402', with ball and shaft moved to new positions 404', 406'). For example, in many implementations, the shaft 406 may comprise a shaft of a small joystick or trackpoint or other rate-control sensitive element integrated within the bottom portion 408 such that deflection of the top portion 402 against the bottom portion 408 of the controller is interpreted as a directional input on the joystick or trackpoint. In many implementations, required deflection of the top surface and bottom surface may be minimal. For example, if the rate-control sensitive element is a force-detecting trackpoint connected to shaft 406, then actual deflection needed may be on the order of a millimeter or less. In many implementations, this may be small enough for the user to effectively ignore consciously, while still applying force during a move that is detectable and interpretable by the controller and computer.

Figure 4C:
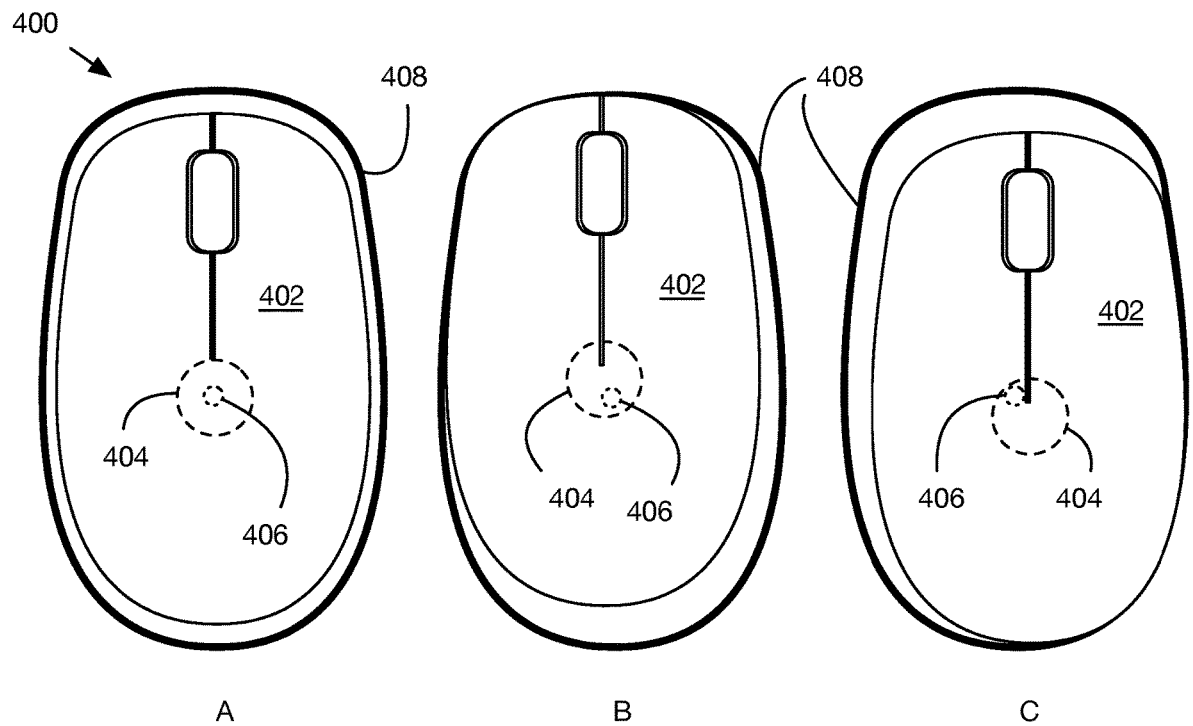
FIG. 4C is an illustration of an embodiment of a hybrid position and rate control input device in various positions.

FIG. 4C is a top-down illustration of an embodiment of a hybrid position and rate control input device in various positions (e.g. centered as in A, to the upper left as in B, and to the lower right, as in C). Ball and shaft 404 and 406 are shown in dashed line as "within" the controller 400 or between the top portion 402 and bottom portion 408. As discussed above, the figure is not shown to scale, and in many implementations, deflection required for interpretation by the rate-control sensitive element may be minimal. As shown, simultaneous X-Y translation or deflection of the top portion 402 against the bottom portion 408 may be possible in many implementations.

As discussed above, the hybrid controller 400 may comprise optical sensors for position-control translation, e.g. on a bottom surface of bottom portion 408. The signal(s) from the position-control optical sensors may be combined or correlated with signals from the rate-control sensitive element between the top and bottom portions of the controller to provide a hybrid of both position- and rate-control over the input device. For example, when a user moves the controller across a surface, the pressure of the user's hand moving the controller may be detectable as a force in the rate-control sensitive element, but as noted above, this initial force detection and deflection may be quite small—however, the position-control optical sensors may detect an immediate high velocity motion, and a processor of the controller may disregard the rate-control value and send movement values based on the position-control sensors to the computing device, such that the cursor or viewpoint moves immediately and quickly, as it would with a mouse. When the user reaches the end of the surface, rather than lifting, translating, and replacing the controller to continue moving the cursor or viewpoint in the same direction, the user may simply leave their hand in the same position, continuing to apply a slight directional force on the top portion relative to the bottom portion, detectable by the rate-control sensitive element. With the optical elements no longer sensing movement, but the rate-control sensitive element showing a continuous force, the controller processor may disregard the position-control sensors and send movement values based on the rate-control sensor to the computing device, such that the cursor or viewpoint continues moving in the direction it was previously moving. As a result, the controller provides both the immediate, high accuracy movement of position-control devices such as mice, and the continuous directional movement of rate-control devices such as joysticks or trackpoints.

Figure 4D:
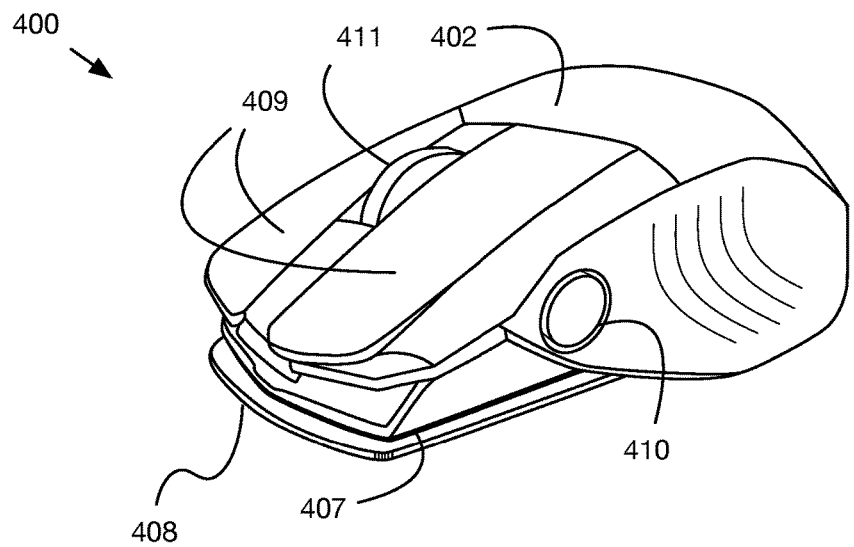
FIG. 4D is a perspective drawing of an embodiment of a hybrid position and rate control input device.

As discussed above, the top portion 402 and bottom portion 408 of the controller 400 may be very closely integrated, such that the controller resembles a typical mouse or other pointing device in form factor with only a slight gap 407 between the portions. For example, FIG. 4D is a perspective drawing of an embodiment of a hybrid position and rate control input device 400, with top portion 402 connected to bottom portion 408 with two translational degrees of freedom (restricted in distance) via a force-sensitive joint. As shown, the gap 407 may be very small or almost imperceptible, and as discussed above, the distance of translation of the top and bottom portions may be minimal, on the order of a millimeter.

In many implementations, the controller 400 may include additional input elements such as buttons 409 and a scroll wheel 411. In some implementations, the controller may also include a second rate-control input device 410 such as a trackpoint for use by a user's thumb. This can provide two additional rotational or translational degrees of freedom. For example, in some implementations, the hybrid position control and rate control sensors may be used to provide X-Y translation inputs; a plurality of optical position control sensors may be used to provide $Z_{rot}$ rotational input as discussed above; and a trackpoint 410 may be used to provide $X_{rot}$ and $Y_{rot}$ rotational input, providing five degrees (two translation and three rotational) degrees of freedom. In a further implementation, discussed in more detail below, a third translational degree of freedom may be provided via the X-Y rate control sensors: while typically used to detect an X-Y translation of the top portion 402 horizontally relative to the bottom portion 408, in such implementations, the sensor may also be used to detect pressure of the top portion against (e.g. vertically towards) the bottom portion 408. This may be used to provide a Z translation input, based on the amount of pressure applied by the user's hand on the top portion 402 downwards through the controller. Accordingly, in some implementations, the controller may provide up to six degrees of freedom.

Figure 4E:
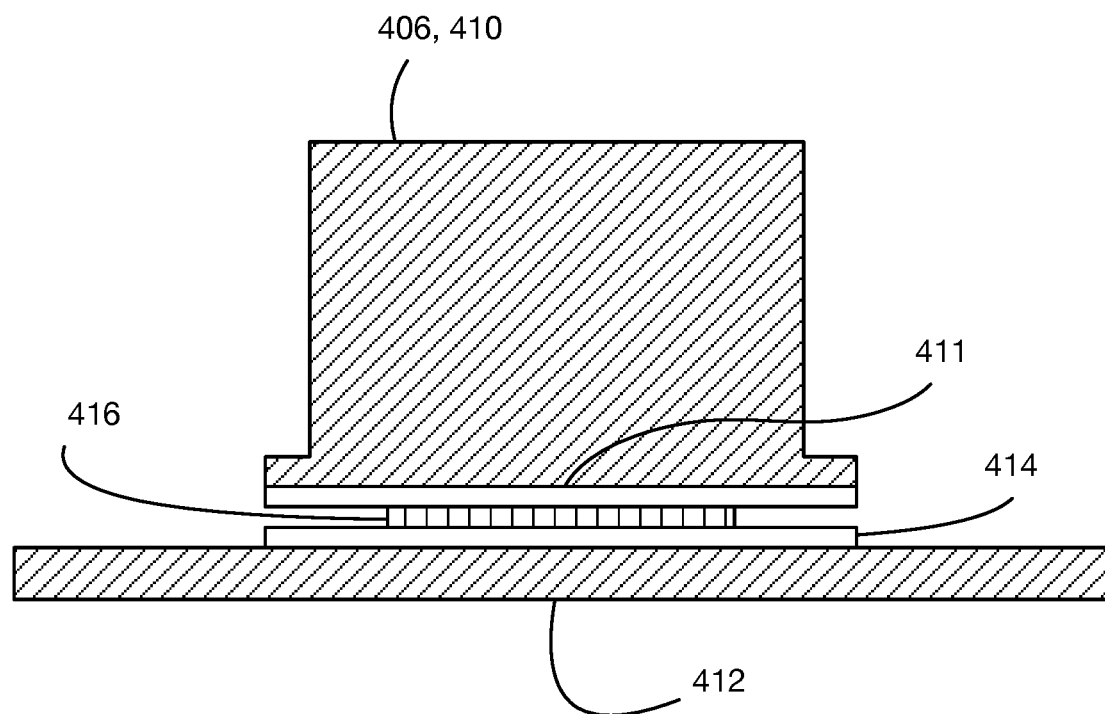
FIGS. 4E and 4F are a cross-sectional side view and a top view, respectively, of an implementation of a force sensing input device.
Figure 4F:
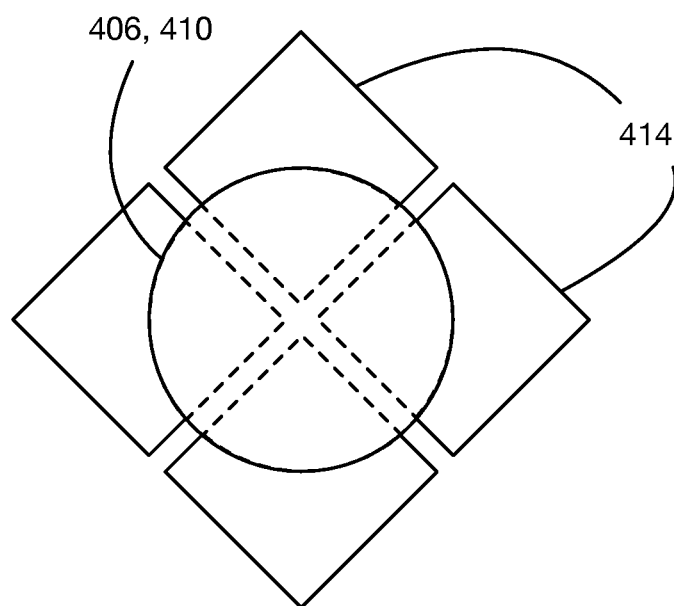

A trackpoint for a user's thumb and/or rate-control input device for relative motion of the top and bottom portions 402, 408 may each comprise a force-sensing input element. An example of such a force sensing input sensing circuit is illustrated in cross-section in FIG. 4E and in top-down view in FIG. 4F (neither figure is shown to scale, with parts enlarged and/or distorted to show detail). Referring first to FIG. 4E, a shaft 406 of a hybrid controller (which may be joined to an interior of a top portion 402 either directly or with a ball joint or other joint) or a manipulatable shaft or button of a trackpoint 410 may include a bottom surface or portion of the shaft 411 that is conductive, or a conductive disc 411 may be attached to the shaft 406, 410. The conductive disc or portion 411 may be connected to a substrate 412 (which may comprise a portion of bottom portion 408 of the controller) via an elastic joint or elastomeric material 416, which may comprise a silicone glue or other flexible adhesive allowing the shaft 406, 410 and conductive disc or portion 411 to be slightly rocked or rotated by the user. Above the substrate and below the conductive portion or disc 411, a plurality of sensing electrodes 414 provide variable capacitive elements in conjunction with the conductive disc 411. As shown in the top-down view of FIG. 4F, the electrodes 414 may be arranged around the center of the shaft, e.g. in cardinal directions or aligned with an X-Y axis (though other orientations may be utilized in other implementations, as well as greater numbers of smaller capacitive electrodes in some implementations). Rocking or rotating the shaft and conductive disc causes the conductive disc 411 to move closer to or farther from the different electrodes 414, increasing or reducing the capacitance accordingly. The capacitance between each electrode 414 and the disc 411 may be measured at a high degree of accuracy, and the resulting values scaled to a predetermined range (e.g. −128 to 128, −256 to 256, or any other such range) for rate-control input use and for comparison and correlation with position-control velocity measurements from the optical sensors of the controller.

Additionally, while discussed primarily in terms of joystick or trackpoint-like directional inputs with opposing sets of electrodes 414 providing opposing capacitance signals when the shaft 406, 410 is rocked (e.g. when the shaft tilts such that the disc 411 is closer to the upper electrode, increasing its capacitance, the disc 411 may be farther from the lower electrode, reducing its capacitance), in some implementations, the adhesive 416 may be sufficiently elastic that the shaft 406, 410 may be pressed downwards towards the substrate 412, lowering the disc 411 relative to all of the electrodes 414 simultaneously and increasing the sensed capacitance in each. Upon detection of such increased capacitance in all of the electrodes (or at least, in opposing pairs of electrodes, indicating a downwards pressure rather than a directional rocking), the capacitance values may be scaled or mapped to z-axis downwards translation. Many such implementations may not be able to detect upwards z-axis translation and/or it may be awkward to require to a user to lift the controller (potentially decreasing capacitance in the electrodes) for upwards z-axis translation. Accordingly, in some such implementations, the z-axis downwards translation may not be used for translation or rotation along an axis, but rather as a triggered command (e.g. a "slam" button or input, when the user applies a downwards force greater than a threshold to the upper portion of the controller towards the bottom portion of the controller). In other implementations, a user interface element (e.g. virtual camera, cursor, etc.) may "float" upwards in a z-axis when no pressure is applied to the controller, remain stationary when light or typical hand pressure is applied to the controller, and sink downwards in a negative z-axis when more pressure is applied. This may be useful for some multi-layer user interfaces, particularly with few layers or where high accuracy is not required to select between layers. In other implementations, the controller may include other sensors to detect deflection, translation, or pressure along the z-axis (e.g. with the top portion deflected or pressed towards the bottom portion). In particular, unlike unibody controllers, because implementations of the controllers discussed herein include separate top portions and bottom portions, such sensors may be easily positioned with each portion relative to the gap. Because the adhesive layer 416 may allow for at least some compression, the distance between the top and bottom portions may vary slightly when pressure is applied. For example, an optical sensor or Hall effect sensor (coupled with a magnet) may be used to measure distance between the top and bottom portions; a capacitive element may be positioned with electrodes in the top and bottom portion, and the capacitance measured to determine their relative distance; etc. In other implementations, mechanical or electromechanical sensors may be utilized, such as piezoelectric elements or strain gauge-based pressure transducers within the adhesive layer or in similar configuration (e.g. at another position in the gap between the top and bottom portions).

Figure 4G:
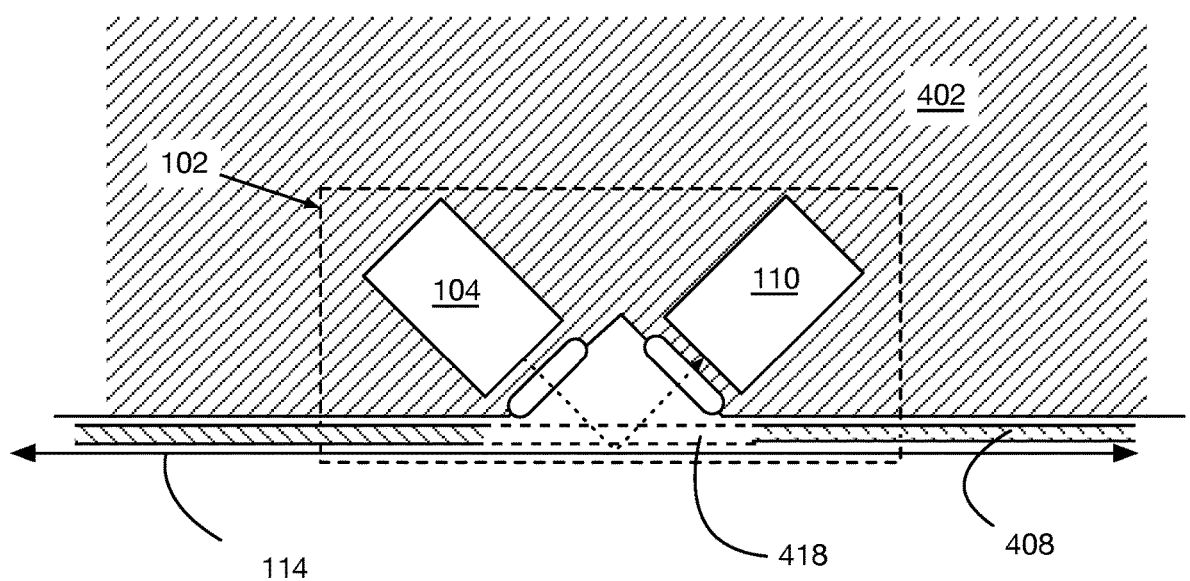
FIG. 4G is a cross-sectional side view of an optical sensor implementation for a hybrid position and rate control input device.

Referring briefly back to FIG. 4D, in the example implementation shown, bottom portion 408 is very thin and may not have sufficient depth to hold optical sensors or other circuitry. In some implementations, to reduce the size of bottom portion 408, while still providing adequate room for optical sensors and the sensing components of the rate-control input element, the sensors and rate control element may be integrated within top portion 402. For example, as shown in the cross-section of FIG. 4G, a bottom portion 408 may comprise one or more windows or holes 418 positioned in proximity to optical sensor(s) 102 on the underside of the top portion 402. The windows or holes 418 may be slightly larger than the optical sensors' opening, such that minor translations of the bottom portion 408 against the top portion 402 do not cause the edges of the windows or holes to occlude the sensors 102.

Similarly, in some implementations, the force-sensing electrodes may be integrated in upper portion 402 (essentially inverting the cross-section of FIG. 4E), with a very short shaft 406 attached to lower portion 402. The conductive portion or disc 411 may be grounded through a separate connection or via a conductive adhesive 416, and accordingly, lower portion 402 need not include additional electronics. In such implementations, lower portion 402 may be on the order of millimeters in thickness.

Figure 5:
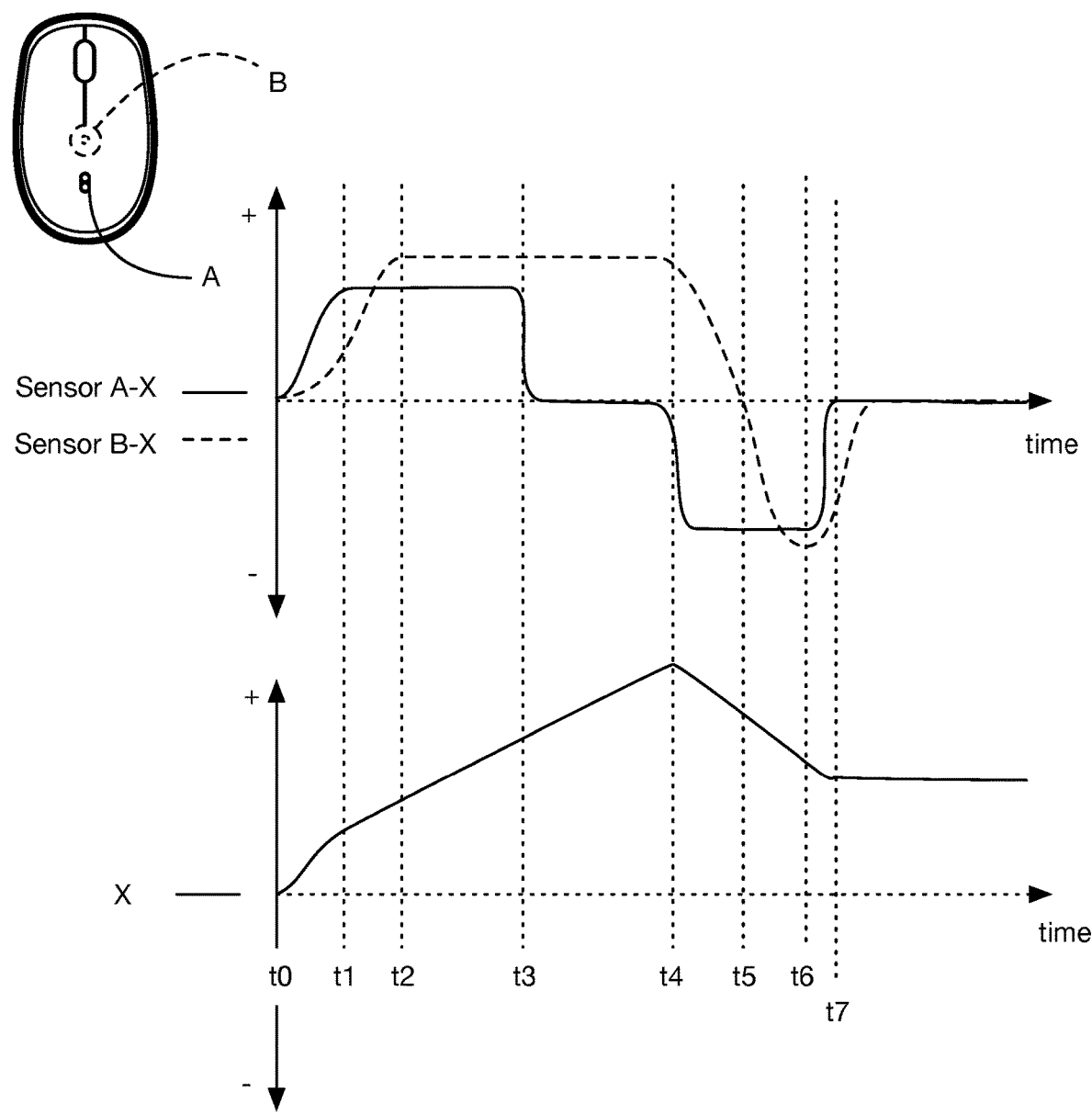
FIG. 5 is a graph illustrating an example of sensor inputs and corresponding translational movement for an implementation of a computer input device having hybrid position and rate control.

FIG. 5 is a graph illustrating an example of sensor inputs and corresponding translational movement (not to scale) for an implementation of a computer input device having hybrid position and rate control. An example controller is shown in top-view with force-sensor and an optical sensor visible in dashed line (e.g. indicating potential positions on the bottom of the controller). For simplicity, in the example illustrated, the controller includes a single optical sensor A and a single force-sensitive element B; however, as discussed above, multiple optical sensors could be utilized (providing higher accuracy and reliability and/or rotational sensing). Also for simplicity, the graph of FIG. 5 illustrates movement and sensed force/velocity only along the X-axis. In practice, X-Y translations (and potentially Z-axis rotations) could be detected, as well as Z-axis translations in some implementations as discussed above.

In the example illustrated, a user may move the controller to the right (X+), accelerating from rest at t0 to t1, and then at a constant speed from t1 to t3. As shown in solid line, the optical sensor directly detects the acceleration and constant movement to the right until t3, at which point the user may reach the right side of their mousepad or desk surface. Meanwhile, the force sensor detects an increasing deflection or amount of force from t0 to t2, at which point the deflection is at a maximum amount. At t3, the user stops moving the controller, but retains their hand in the same position with force on the right side of the controller such that the force sensor continues to detect a force in the X+ direction.

Movement of a user interface element such as a cursor or virtual camera or other X-axis controlled element is shown in the lower graph. From t0 to t1, the cursor or element accelerates to the right corresponding to the detected velocity (and similarly accelerating motion) of the optical sensor. From t1 to t3, the cursor or element continues moving to the right at a constant velocity corresponding to the optical sensor's detected velocity. However, from t3 to t4, rather than stopping when the user reaches the edge of the mousepad or desk and stops moving the controller, the controller uses the rate-control values from the force sensor to continue moving the cursor or element to the right at a constant velocity.

As discussed above, when reversing direction of a rate-control interface device, the user must typically move a joystick shaft or other element from one extreme position (e.g. all the way to the right) through an initial position (e.g. upright) to another extreme position (e.g. all the way to the left), which may take substantial time. As shown in FIG. 5, after holding the controller stationary with a force to the right such that the cursor or element moves to the right with a constant velocity from t3 to t4, at t4 to t6, the user starts moving the controller to the left with a similar constant velocity. The force sensing element first returns to a default position from t4 to t5 and then continues moving to an extreme left position from t5 to t6. However, rather than slowing the velocity of the cursor or element to the right down to zero from t4 to t5 and then beginning to accelerate back to the left from t5 to t6, the hybrid controller can instead immediately utilize the detected X− velocity from the optical sensor and immediately reverse the direction of the cursor or element, as shown in the lower graph of FIG. 5 at t4.

Similarly, at t6-t7, the user may stop moving the controller, and not apply any force to the left side of the controller (or release the force previously being applied). While the force sensing element may take some time as shown to return to a default position, the optical sensor may immediately detect that the position is stationary or that velocity has dropped to zero. The controller may note the reduction in force and stationary velocity and use the position-control data to stop the cursor or element (as opposed to the stationary velocity with continued force at t3 during which the rate-control signal was utilized).

Accordingly, implementations of the hybrid controller provide for both instantaneous movement and reversing of direction of position-control input devices, and indefinitely continued movement in any direction of rate-control input devices. This may obviate users having to switch between different controllers for different uses.

Figure 6:
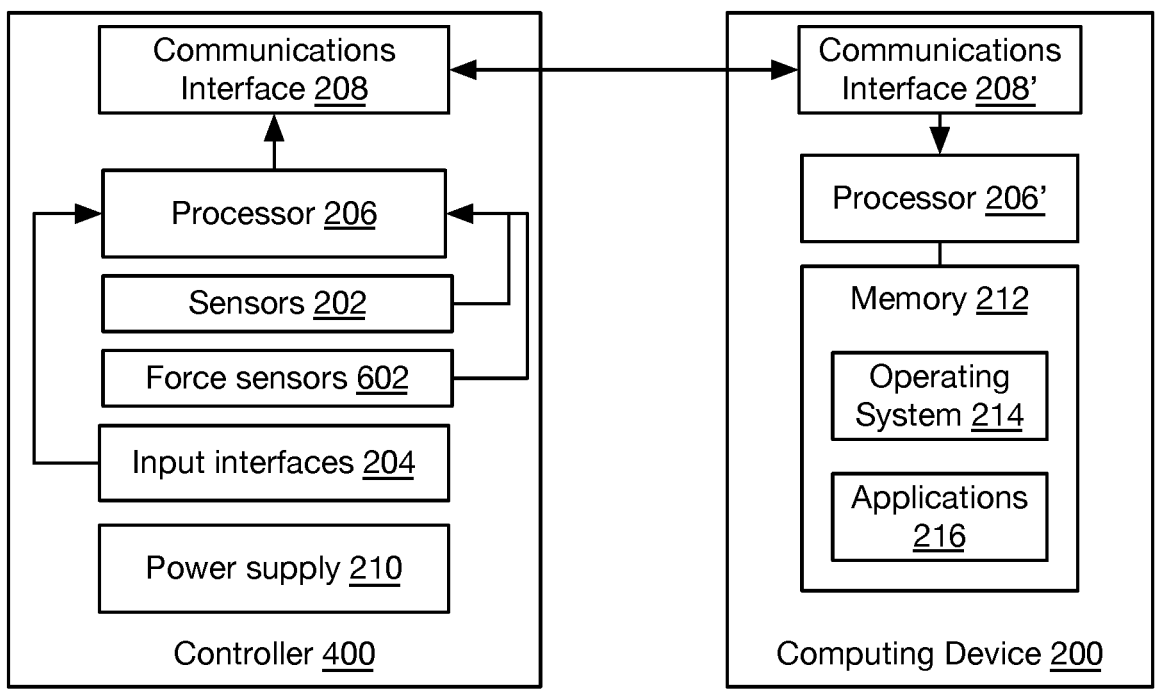
FIG. 6 is a block diagram of an embodiment of a computer input device having hybrid position and rate control.

FIG. 6 is a block diagram of an embodiment of a computer input device having hybrid position and rate control 400, similar to the controller 100 of FIG. 2. As shown, the controller 600 and computing device 200 may have many of the components discussed above in connection with FIG. 2, and may also have one or more force or rate control sensors 602. As discussed above, a force sensor 602 may comprise a plurality of capacitive elements with a shaft connected to either a ground plane or electrodes, such that movement of the shaft moves opposing pairs of electrodes respectively closer and farther from the ground plane, with corresponding increasing and decreasing capacitance. In other implementations, a gimbal mechanism and variable resistors 602 may be used as in a two-axis analog joystick to detect deflection in the x-y directions. Accordingly, although discussed primarily above in terms of a trackpoint-style force sensing element, in some implementations, an analog two-axis deflection sensing element may be utilized instead. The shaft connecting top portion 402 and bottom portion 408 of the controller may be connected to conductive wipers of semi-circular variable resistors arranged in the x-y axes, with the resistive values scaled to corresponding cursor or element movement rates (e.g. −128 to 128; −256 to 256; etc.). In still other implementations, a digital joystick circuit (sometimes referred to as a 4-way or 8-way directional pad) may be utilized, with an array of buttons or electrical contacts (e.g. 4 or 8) positioned under the shaft, such that pushing the shaft in any direction causes the conductive disc or other element to press a corresponding button or close a circuit, corresponding to movement in that direction. Such implementations may be cheaper to construct, but may be less accurate, particularly with movement in non-cardinal directions. Other sensing mechanisms may be utilized including optical joystick mechanisms (e.g. with a shaft connected to a gimbaling mechanism, and optical deflection sensors measuring deflection of the shaft and/or gimbals), strain gauges (e.g. wires with force-variable resistance), piezoelectric sensors, Hall effect sensors (e.g. measuring deflection of a magnet on shaft 406), or any other such sensing mechanism. As the top portion 402 and bottom portion 408 do not need as much deflection as in typical joystick controllers, many short-range force or pressure sensitive mechanisms may be employed that would be impractical in other implementations.

In some implementations, the processor may transcode or translate outputs of the position and/or rate control sensors into a common format. For example, many operating systems use HID drivers that interpret an input device as a mouse or joystick, but not both, and it may be confusing to the system to first receive mouse-type position delta data when the controller is moved, and then receive stick-type vector data when the top surface of the controller is pressed in the same direction. Accordingly, in some implementations to avoid having a custom driver or to be compatible with existing mouse HID drivers, the processor of the controller may transcode rate-control data from the rate-control sensors to position delta data that may be utilized in place of position data from the position control sensors. For example, given a controller moved over time such that the position data reports a change in position from 0,0 to 0,100 and then held stationary with pressure in a positive y direction, the processor may iteratively add a delta to the position data (e.g. 5 per time period, 10 per time period, or any other such delta depending on the rate control value) and continue reporting position changes (e.g. 0,105; 0,110; 0,115; etc.) such that a computing device receiving the HID data can interpret the continuous motion as mouse type position data. Accordingly, in some such implementations, the computing device may be agnostic to or not know of the rate control data, and thus may utilize a standard mouse HID driver.

Figure 7:
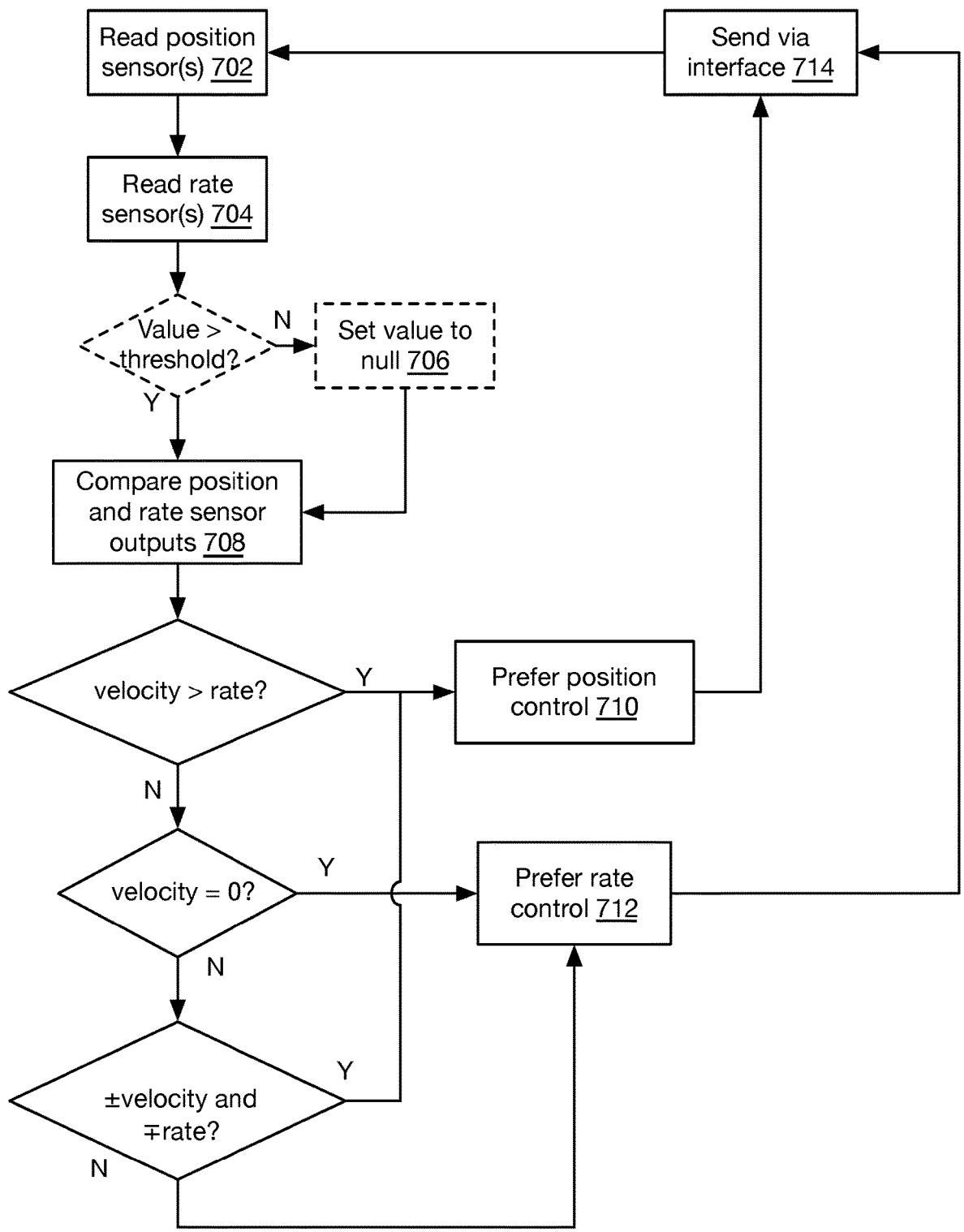
FIG. 7 is a flow chart of an embodiment of a method for hybrid position and rate control of a computer input device.

FIG. 7 is a flow chart of an embodiment of a method for hybrid position and rate control of a computer input device. In the implementation shown, at step 702, a controller may read the values from a position sensor (or plurality of sensors, as discussed above, with detected translation values utilized at step 702 rather than detected rotational values). At step 704, the controller may read values from one or more rate sensors. In each case, reading the values may comprise performing additional processing, such as the comparisons of multiple sensors as discussed above in connection with FIG. 3, or additional scaling, filtering, or normalizing operations. For example, in some implementations, if a value is less than a threshold, at step 706, the value may be set to 0 or null to provide a "dead zone" for the controller. This may be particularly useful for rate control sensors that may experience slight drift from calibrated null positions.

At step 708, a processor of the controller may compare the determined position sensor and rate sensor outputs (or compare the indicated rate to a sensed velocity). If the velocity exceeds the rate, then at step 710 in some implementations, the determined velocity from the position sensor(s) will be utilized and the rate control output disregarded. If the velocity is equal to zero, then at step 712 in some implementations, the rate control output will be utilized and the velocity from the position sensor(s) disregarded (e.g. when the rate is non-zero but the position is zero, such as when a user has moved the controller to an edge of a surface or mousepad and stopped, but continued applying pressure). If the velocity and rate are both non-zero but with opposite signs (e.g. because the user has reversed direction of the controller, such that the rate is larger in value but the position sensors are beginning to detect a reverse velocity), in some implementations, the velocity from the position sensor(s) will be utilized at step 710. If the velocity is non-zero, but less than the rate control output and in the same direction, then in some implementations, the rate control output may be utilized at step 712. This may prevent the cursor or movable element of a user interface from stuttering as the controller is slowed nearing the edge of a mousepad or desk in some implementations. The selected control output, either position control at step 710 or rate control at step 712 may be provided via a communication interface to a computing device, as discussed above.

The systems and methods discussed herein provide a new hybrid position and rate control input device. The input device incorporates aspects of both joysticks or trackpoints and computer mice to provide for easy and intuitive translation movement with both high accuracy and limitless, continual movement.

In one aspect, the present disclosure is directed to embodiments of a computer input device, comprising: a housing comprising an upper portion and a lower portion; a force-detecting sensor; a motion-detecting sensor within one of the upper portion and the lower portion of the housing, configured to detect motion of the housing relative to a surface; a communication interface positioned within the housing; and a processor positioned within the housing. The force-detecting sensor comprises a first element attached to one of the upper portion and the lower portion of the housing; a second element attached to the other of the upper portion and the lower portion of the housing; an attachment between the first element and the second element having two degrees of freedom; and force-detecting circuitry configured to detect a translation or rotation of the first element relative to the second element. The processor is configured to receive a first translation signal from the motion-detecting sensor indicating a translation of the housing; receive a second translation signal from the force-detecting sensor indicating a translation or rotation of the first element relative to the second element; select one of the first translation signal and second translation signal, responsive to a comparison between the first translation signal and second translation signal; and transmit, via the communication interface to a computing device, the selected translation signal.

In some implementations, the force-detecting circuitry comprises a plurality of capacitive sensors. In some implementations, the attachment between the first element and the second element comprises an elastic adhesive having two rotational degrees of freedom. In some implementations, the attachment between the first element and the second element comprises a ball and socket joint having two rotational degrees of freedom. In some implementations, the processor is further configured to select the first translation signal responsive to the first translation signal exceeding the second translation signal. In some implementations, the processor is further configured to select the first translation signal responsive to the first translation signal being in an opposing direction to the second translation signal. In some implementations, the processor is further configured to select the second translation signal responsive to the first translation signal being zero and the second translation signal being above a threshold. In some implementations, the processor is further configured to select the second translation signal responsive to the second translation signal exceeding the first translation signal.

In some implementations, the first translation signal is a position-control signal and the second translation signal is a rate-control signal. In a further implementation, the processor is further configured to transcode the rate-control signal to a position-control signal. In a still further implementation, the computing device is agnostic to the rate-control signal.

In some implementations, the processor is further configured to receive a third signal from the force-detecting sensor indicating a translation of the first element towards the second element; and transmit, via the communication interface to the computing device, a signal indicating a translation in a z-axis.

In some implementations, the motion-detecting sensor further comprises: a first motion-detecting sensor positioned at a first location on an underside of the housing; and a second motion-detecting sensor positioned at a second location on an underside of the housing; and the processor is further configured to generate the first translation signal by: receiving a third translation signal from the first motion-detecting sensor; receiving a fourth translation signal from the second motion-detecting sensor; identifying, based on the third and fourth translation signals, the translation of the housing; and generating the first translation signal corresponding to the identified translation. In a further implementation, the first location is in opposition to the second location across a centroid of the underside of the housing. In another further implementation, the first motion-detecting sensor and second motion-detecting sensor each comprise an imaging array. In another further implementation, the processor is further configured to: receive a fifth translation signal from the first motion-detecting sensor; receive a sixth translation signal from the second motion-detecting sensor; identify, based on the fifth and sixth translation signals, a rotation of the housing; and transmit, via the communication interface to the computing device, a signal comprising the identified rotation the first translation signal corresponding to the identified translation. In a still further implementation, the first motion-detecting sensor and the second motion-detecting sensor are configured to detect a translation in an X-Y plane; and the processor is further configured to identify the rotation of the housing around a Z-axis orthogonal to the X-Y plane. In another still further implementation, the processor is further configured to identify the rotation of the housing responsive to the fifth translation signal having a first direction and the sixth translation signal having a second, opposing direction.

In some implementations, the computer input device further comprises a second force-detecting sensor attached to the housing and positioned to receive a finger or thumb of a user of the computer input device; and the processor is further configured to receive a signal from the second force-detecting sensor, and transmit, via the communication interface to the computing device, a signal indicating a rotation around an X or Y axis based on the signal from the second force-detecting sensor. In some implementations, the computer input device further comprises at least one input button or input wheel.

In another aspect, the present disclosure is directed to a method for communicating translation of a computer input device with hybrid modes, comprising: receiving, by a processor of a computer input device, a first translation signal from a motion-detecting sensor of the computer input device indicating a translation of a housing of the computer input device; receiving, by the processor, a second translation signal from a force-detecting sensor, wherein the force-detecting sensor comprises a first element attached to one of an upper portion and a lower portion of the housing, a second element attached to the other of the upper portion and the lower portion of the housing, an attachment between the first element and the second element having at least one degree of freedom (and in some implementations, at least two degrees of freedom), and force-detecting circuitry configured to detect a translation or rotation of the first element relative to the second element, and wherein the second translation signal indicates a translation or rotation of the first element relative to the second element; selecting, by the processor, one of the first translation signal and second translation signal, responsive to a comparison between the first translation signal and second translation signal; and transmitting, by the processor via a communication interface positioned within the housing of the computer input device to a computing device, the selected translation signal.

In some implementations, the force-detecting circuitry comprises a plurality of capacitive sensors. In some implementations, the attachment between the first element and the second element comprises an elastic adhesive having two rotational degrees of freedom. In some implementations, the attachment between the first element and the second element comprises a ball and socket joint having two rotational degrees of freedom.

In some implementations, the method includes selecting the first translation signal responsive to the first translation signal exceeding the second translation signal. In some implementations, the method includes selecting the first translation signal responsive to the first translation signal being in an opposing direction to the second translation signal. In some implementations, the method includes selecting the second translation signal responsive to the first translation signal being zero and the second translation signal being above a threshold. In some implementations, the method includes selecting the second translation signal responsive to the second translation signal exceeding the first translation signal.

In some implementations, the first translation signal is a position-control signal and wherein the second translation signal is a rate-control signal. In a further implementation, the method includes transcoding the rate-control signal to a position-control signal. In a still further implementation, the computing device is agnostic to the rate-control signal.

In some implementations, the method includes receiving a third signal from the force-detecting sensor indicating a translation of the first element towards the second element; and transmitting, via the communication interface to the computing device, a signal indicating a translation in a z-axis.

In some implementations, the motion-detecting sensor further comprises a first motion-detecting sensor positioned at a first location on an underside of the housing; and a second motion-detecting sensor positioned at a second location on an underside of the housing; and the method includes generating the first translation signal by: receiving a third translation signal from the first motion-detecting sensor; receiving a fourth translation signal from the second motion-detecting sensor; identifying, based on the third and fourth translation signals, the translation of the housing; and generating the first translation signal corresponding to the identified translation. In a further implementation, the first location is in opposition to the second location across a centroid of the underside of the housing. In another further implementation, the first motion-detecting sensor and second motion-detecting sensor each comprise an imaging array. In another further implementation, the method includes: receiving a fifth translation signal from the first motion-detecting sensor; receiving a sixth translation signal from the second motion-detecting sensor; identifying, based on the fifth and sixth translation signals, a rotation of the housing; and transmitting, via the communication interface to the computing device, a signal comprising the identified rotation the first translation signal corresponding to the identified translation. In a still further implementation, the first motion-detecting sensor and the second motion-detecting sensor are configured to detect a translation in an X-Y plane; and the method includes identifying the rotation of the housing around a Z-axis orthogonal to the X-Y plane. In another still further implementation, the method includes identifying the rotation of the housing responsive to the fifth translation signal having a first direction and the sixth translation signal having a second, opposing direction.

In some implementations, the computer input device includes a second force-detecting sensor attached to the housing and positioned to receive a finger or thumb of a user of the computer input device; and the method includes receiving, by the processor, a signal from the second force-detecting sensor; and transmitting, by the processor via the communication interface to the computing device, a signal indicating a rotation around an X or Y axis based on the signal from the second force-detecting sensor. In some implementations, the computer input device includes at least one input button or input wheel.

C. Computing Environment

Having discussed specific embodiments of the present solution, it may be helpful to describe aspects of the operating environment as well as associated system components (e.g., hardware elements) in connection with the methods and systems described herein.

Figure 8A:
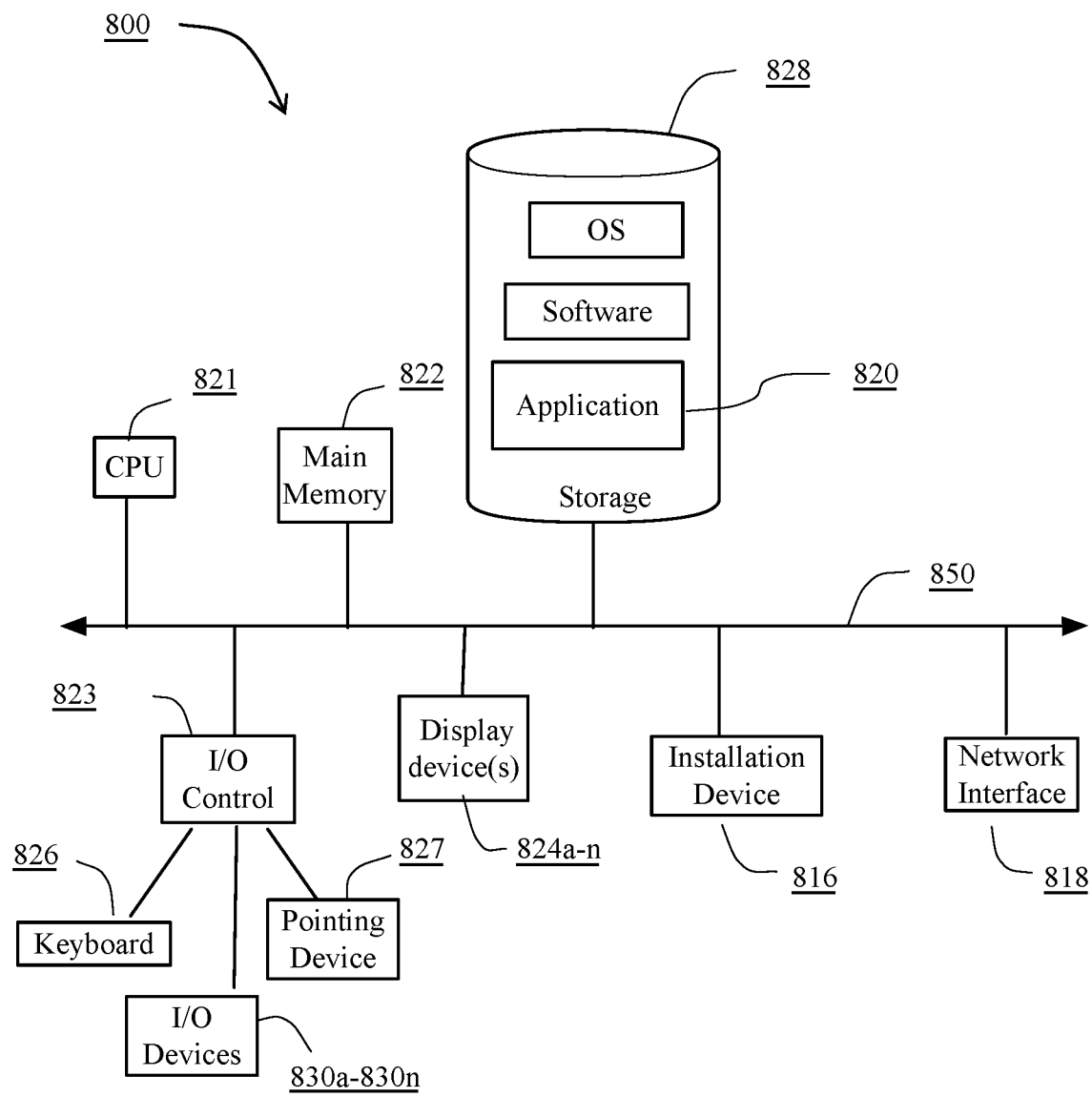
FIGS. 8A and 8B are block diagrams depicting embodiments of computing devices useful in connection with the methods and systems described herein.
Figure 8B:
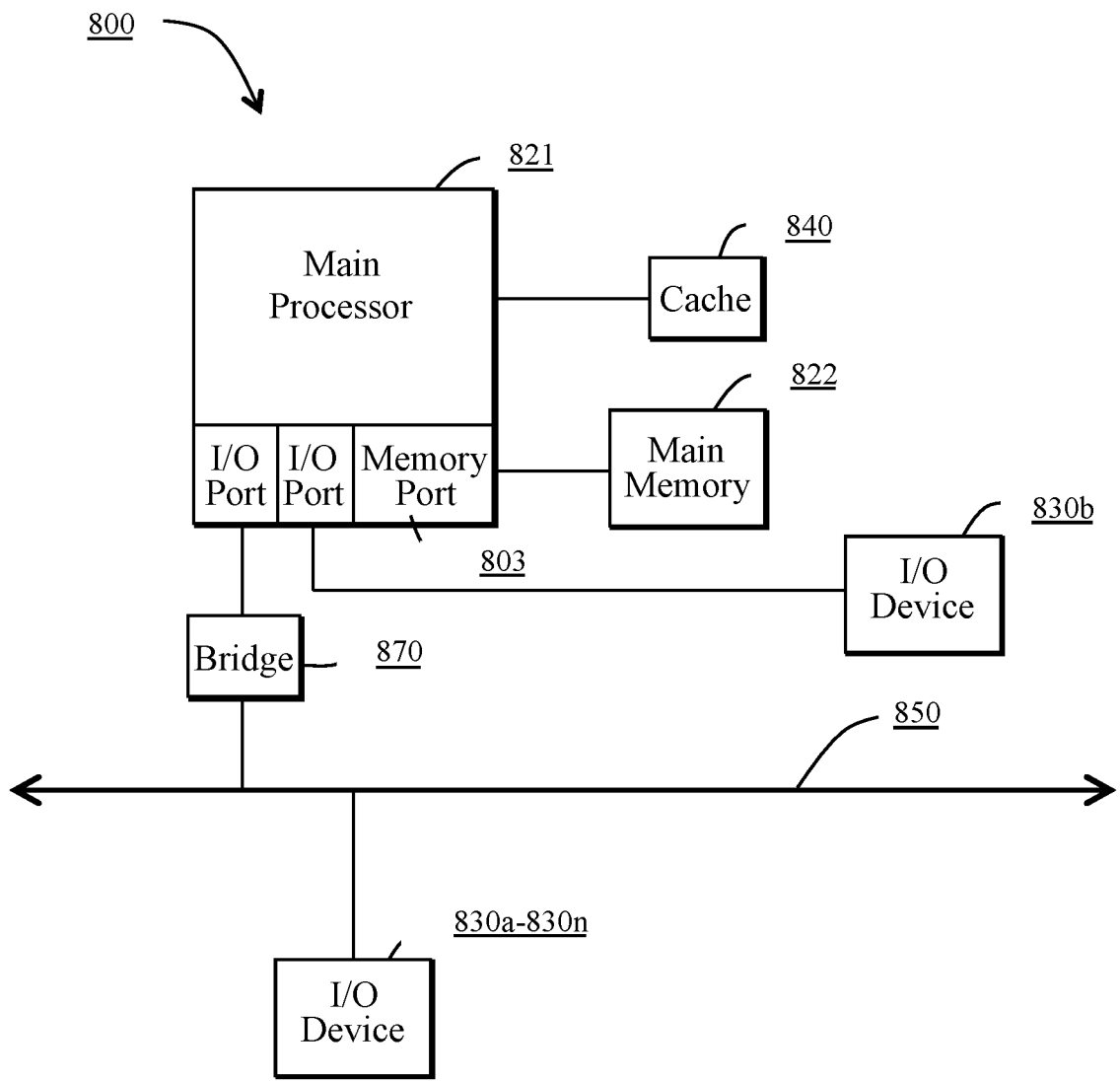

The systems discussed herein may be deployed as and/or executed on any type and form of computing device, such as a computer, network device or appliance capable of communicating on any type and form of network and performing the operations described herein. FIGS. 8A and 8B depict block diagrams of a computing device 800 useful for practicing an embodiment of the wireless communication devices 802 or the access point 806. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 800 may be based on any of these processors, or any other processor capable of operating as described herein.

Main memory unit 822 may be one or more memory chips capable of storing data and allowing any storage location to be directly accessed by the microprocessor 821, such as any type or variant of Static random access memory (SRAM), Dynamic random access memory (DRAM), Ferroelectric RAM (FRAM), NAND Flash, NOR Flash and Solid State Drives (SSD). The main memory 822 may be based on any of the above described memory chips, or any other available memory chips capable of operating as described herein. In the embodiment shown in FIG. 8A, the processor 821 communicates with main memory 822 via a system bus 850 (described in more detail below). FIG. 8B depicts an embodiment of a computing device 800 in which the processor communicates directly with main memory 822 via a memory port 803. For example, in FIG. 8B the main memory 822 may be DRDRAM.

FIG. 8B depicts an embodiment in which the main processor 821 communicates directly with cache memory 840 via a secondary bus, sometimes referred to as a backside bus. In other embodiments, the main processor 821 communicates with cache memory 840 using the system bus 850. Cache memory 840 typically has a faster response time than main memory 822 and is provided by, for example, SRAM, BSRAM, or EDRAM. In the embodiment shown in FIG. 8B, the processor 821 communicates with various I/O devices 830 via a local system bus 850. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the processor 821 may use an Advanced Graphics Port (AGP) to communicate with the display 824. FIG. 8B depicts an embodiment of a computer 800 in which the main processor 821 may communicate directly with I/O device 830b, for example via HYPERTRANSPORT, RAPIDIO, or INFINIBAND communications technology. FIG. 8B also depicts an embodiment in which local busses and direct communication are mixed: the processor 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation medium 816 for the computing device 800. In still other embodiments, the computing device 800 may provide USB connections (not shown) to receive handheld USB storage devices such as the USB Flash Drive line of devices manufactured by Twintech Industry, Inc. of Los Alamitos, Calif.

Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 804 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some embodiments, the computing device 800 may include or be connected to one or more display devices 824a-824n. As such, any of the I/O devices 830a-830n and/or the I/O controller 823 may include any type and/or form of suitable hardware, software, or combination of hardware and software to support, enable or provide for the connection and use of the display device(s) 824a-824n by the computing device 800. For example, the computing device 800 may include any type and/or form of video adapter, video card, driver, and/or library to interface, communicate, connect or otherwise use the display device(s) 824a-824n. In one embodiment, a video adapter may include multiple connectors to interface to the display device(s) 824a-824n. In other embodiments, the computing device 800 may include multiple video adapters, with each video adapter connected to the display device(s) 824a-824n. In some embodiments, any portion of the operating system of the computing device 800 may be configured for using multiple displays 824a-824n. One ordinarily skilled in the art will recognize and appreciate the various ways and embodiments that a computing device 800 may be configured to have one or more display devices 824a-824n.

In further embodiments, an I/O device 830 may be a bridge between the system bus 850 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 800 of the sort depicted in FIGS. 8A and 8B may operate under the control of an operating system, which control scheduling of tasks and access to system resources. The computing device 800 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 800 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 800 has sufficient processor power and memory capacity to perform the operations described herein.

In some embodiments, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A computer input device, comprising:
   a communication interface;
   a motion-detecting sensor;
   a force-detecting sensor; and
   processing circuitry configured to:
      receive a first signal from the motion-detecting sensor,
      receive a second signal from the force-detecting sensor,
      select one of the first signal and the second signal, responsive to a comparison between the first signal and the second signal, and
      transmit, via the communication interface to a computing device, the selected signal.

2. The computer input device of claim 1, wherein the transmitted signal identifies a translation of the computer input device across a surface.

3. The computer input device of claim 1, wherein the processing circuitry is further configured to select the first signal responsive to the first signal exceeding the second signal.

4. The computer input device of claim 1, wherein the processing circuitry is further configured to select the first signal responsive to the first signal indicating a translation in an opposing direction to a translation indicated by the second signal.

5. The computer input device of claim 1, wherein the processing circuitry is further configured to select the second signal responsive to the first signal indicating no translation and the second signal indicating translation greater than a threshold.

6. The computer input device of claim 1, wherein the processing circuitry is further configured to select the second signal responsive to the second signal exceeding the first signal.

7. The computer input device of claim 1, wherein the first signal is a position-control signal and wherein the second signal is a rate-control signal.

8. The computer input device of claim 7, wherein the processing circuitry is further configured to transcode the rate-control signal to a position-control signal.

9. The computer input device of claim 1, wherein the force-detecting sensor comprises:
   a first element attached to one of an upper portion and a lower portion of the computer input device,
   a second element attached to the other of the upper portion and the lower portion of the computer input device, and
   an attachment between the first element and the second element having at least one degree of freedom.

10. The computer input device of claim 9, wherein the attachment between the first element and the second element comprises an elastic adhesive having two rotational degrees of freedom.

11. The computer input device of claim 9, wherein the attachment between the first element and the second element comprises a ball and socket joint having two rotational degrees of freedom.

12. The computer input device of claim 9, wherein the force-detecting sensor further comprises force-detecting circuitry configured to detect a translation or rotation of the first element relative to the second element.

13. The computer input device of claim 1, wherein the motion-detecting sensor is configured to detect motion of the computer input device relative to a surface.

14. The computer input device of claim 1, wherein the motion-detecting sensor further comprises:
- a first motion-detecting sensor positioned at a first location on an underside of the computer input device; and
- a second motion-detecting sensor positioned at a second location on an underside of the computer input device; and
- wherein the first signal is generated from a comparison of an output of the first motion-detecting sensor and an output of the second motion-detecting sensor.

15. The computer input device of claim 14, wherein the first signal indicates a rotation of the computer input device.

16. The computer input device of claim 14, wherein the first motion-detecting sensor and the second motion-detecting sensor are configured to detect a translation in an X-Y plane; and wherein the processing circuitry is further configured to identify the rotation of the computer input device around a Z-axis orthogonal to the X-Y plane.

17. A method for controlling a computer graphic user interface, comprising:
- detecting, by a computer input device, a first signal from a motion-detecting sensor of the computer input device;
- detecting, by the computer input device, a second signal from a force-detecting sensor of the computer input device;
- selecting, by the computer input device, one of the first signal and the second signal, responsive to a comparison between the first signal and the second signal; and
- transmitting, by the computer input device to a computing device, the selected signal.

18. The method of claim 17, wherein the transmitted signal identifies a translation of the computer input device across a surface.

19. The method of claim 17, wherein detecting the second signal from the force-detecting sensor comprises detecting a translation or rotation of a first element attached to one of an upper portion and a lower portion of the computer input device relative to a second element attached to the other of the upper portion and the lower portion of the computer input device by an attachment between the first element and the second element having at least one degree of freedom.

20. The method of claim 17, wherein detecting the first signal from the motion-detecting sensor comprises:
- detecting a third signal from a first motion-detecting sensor positioned at a first location on an underside of the computer input device;
- detecting a fourth signal from a second motion-detecting sensor positioned at a second location on an underside of the computer input device; and
- generating the first signal based on a comparison of an output of the first motion-detecting sensor and an output of the second motion-detecting sensor, the first signal indicating a translation or rotation of the computer input device.

* * * * *